United States Patent
Sugiyama et al.

(10) Patent No.: US 10,152,174 B2
(45) Date of Patent: Dec. 11, 2018

(54) POSITION INPUT DEVICE AND TOUCH PANEL

(71) Applicant: Sharp Kabushiki Kaisha, Osaka (JP)

(72) Inventors: Koichi Sugiyama, Osaka (JP);
Nobuyuki Yoshioka, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/303,046

(22) PCT Filed: Mar. 30, 2015

(86) PCT No.: PCT/JP2015/059929
§ 371 (c)(1),
(2) Date: Oct. 10, 2016

(87) PCT Pub. No.: WO2015/159695
PCT Pub. Date: Oct. 22, 2015

(65) Prior Publication Data
US 2017/0031516 A1    Feb. 2, 2017

(30) Foreign Application Priority Data

Apr. 16, 2014    (JP) ................. 2014-084888

(51) Int. Cl.
*G06F 3/041*    (2006.01)
*G06F 3/042*    (2006.01)

(52) U.S. Cl.
CPC .......... *G06F 3/0416* (2013.01); *G06F 3/0421* (2013.01); *G06F 2203/04109* (2013.01)

(58) Field of Classification Search
CPC ................. G06F 3/0416; G06F 3/0421; G06F 2203/04109
See application file for complete search history.

(56) References Cited

U.S. PATENT DOCUMENTS

2005/0094154 A1*  5/2005  Baney ................. G06F 3/03544
356/499
2010/0079409 A1*  4/2010  Sirotich ................ G06F 3/0425
345/175
(Continued)

FOREIGN PATENT DOCUMENTS

JP    2009-258967    11/2009
JP    2013-250812    12/2013
(Continued)

OTHER PUBLICATIONS

International Search Report for corresponding International Application No. PCT/JP2015/059929 dated May 12, 2015.

*Primary Examiner* — Andrew Sasinowski
(74) *Attorney, Agent, or Firm* — ScienBiziP, P.C.

(57) ABSTRACT

An FTIR touch panel (100) includes a light guide plate (11) and a prism (14) joined to the light guide plate (11). The prism (14) includes a side surface (14a), which is a joining portion that is joined to the light guide plate (11), and a groove (141) in which a light source (12) is inserted. Light emitted from the light source (12) is incident on the prism (14) through a wall surface of the groove (141), and travels from the prism (14) to the light guide plate (11) through the side surface (14a). Plating (200) is formed on a surface of the prism (14) over a region excluding the side surface (14a) and the wall surface of the groove (141). Accordingly, a touch panel having a high position detection accuracy can be provided.

11 Claims, 15 Drawing Sheets

(56) References Cited

U.S. PATENT DOCUMENTS

| | | | |
|---|---|---|---|
| 2012/0033155 A1* | 2/2012 | Asano | G02B 1/105 |
| | | | 349/62 |
| 2012/0044209 A1* | 2/2012 | Kim | G06F 3/0421 |
| | | | 345/175 |
| 2012/0154408 A1* | 6/2012 | Yukawa | G06F 1/1601 |
| | | | 345/473 |
| 2012/0235955 A1* | 9/2012 | Ng | G06F 3/03547 |
| | | | 345/175 |
| 2013/0127790 A1* | 5/2013 | Wassvik | G06F 3/042 |
| | | | 345/175 |
| 2013/0181896 A1* | 7/2013 | Gruhlke | G06F 3/017 |
| | | | 345/156 |
| 2016/0282990 A1* | 9/2016 | Kimura | G02F 1/13338 |

FOREIGN PATENT DOCUMENTS

| | | |
|---|---|---|
| JP | 2013-250813 | 12/2013 |
| JP | 2013-250814 | 12/2013 |
| JP | 2013-250815 | 12/2013 |
| JP | 2013-250816 | 12/2013 |
| JP | 2013-250817 | 12/2013 |
| JP | 2014-002476 | 1/2014 |
| JP | 2014-021789 | 2/2014 |
| JP | 2014-021790 | 2/2014 |
| WO | WO 2013/125502 A1 | 8/2013 |

* cited by examiner

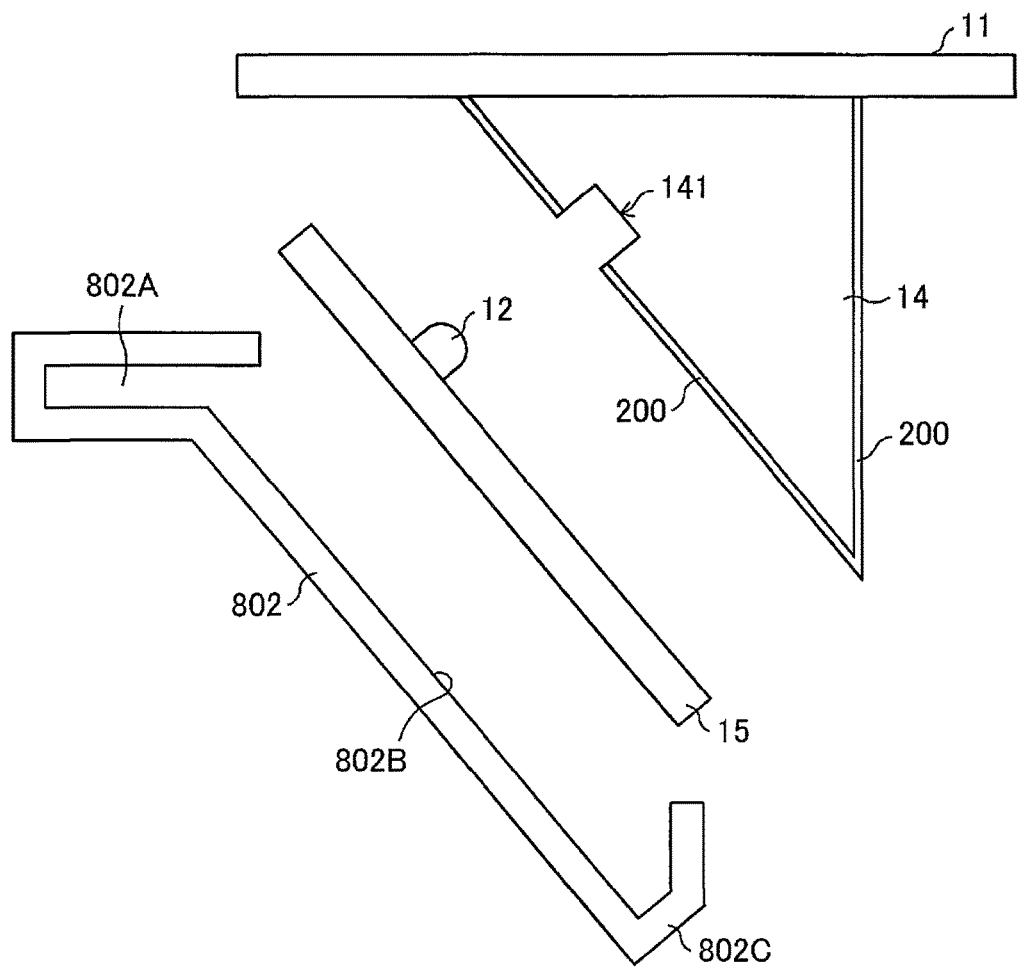

POSITION INPUT DEVICE AND TOUCH PANEL

TECHNICAL FIELD

The present invention relates to a touch panel that detects a contact position of a contact operation (touch operation) performed by a user.

BACKGROUND ART

As described in PTL 1, an example of a known touch panel that detects a contact position of a contact operation performed by a user includes a light guide plate that faces a display screen, a light source that emits light toward the light guide plate, and a light-receiving element that faces a side end surface of the light guide plate. The touch panel is an FTIR touch panel that detects a contact position at which a detection target, such as a finger or a pen, comes into contact with the light guide plate by detecting scattered light generated when the detection target comes into contact with light guide plate with the light-receiving element.

PTL 2 to PTL 10 listed below propose FTIR touch panels in which light emitted from a light source is incident on a light guide plate through a prism joined to the light guide plate.

CITATION LIST

Patent Literature

PTL 1: Japanese Unexamined Patent Application Publication No. 2009-258967
PTL 2: Japanese Unexamined Patent Application Publication No. 2013-250812
PTL 3: Japanese Unexamined Patent Application Publication No. 2013-250813
PTL 4: Japanese Unexamined Patent Application Publication No. 2013-250814
PTL 5: Japanese Unexamined Patent Application Publication No. 2013-250815
PTL 6: Japanese Unexamined Patent Application Publication No. 2013-250816
PTL 7: Japanese Unexamined Patent Application Publication No. 2013-250817
PTL 8: Japanese Unexamined Patent Application Publication No. 2014-2476
PTL 9: Japanese Unexamined Patent Application Publication No. 2014-21789
PTL 10: Japanese Unexamined Patent Application Publication No. 2014-21790

SUMMARY OF INVENTION

Technical Problem

A touch panel in which light emitted from a light source is incident on a light guide plate through a prism joined to the light guide plate causes light leakage from surfaces of the prism in a region other than the joining portion that is joined to the light guide plate, although the amount of leakage is small. The position detection accuracy decreases due to light that has leaked (leak light) and reached the light-receiving element.

The present invention has been made in light of the above-described problem, and an object of the present invention is to provide a position input device and a touch panel having a high position detection accuracy.

Solution to Problem

To achieve the above-described object, according to an aspect of the present invention, a position input device included in a touch panel that detects a contact position of a contact operation includes a light source; a light guide plate; a prism including a joining portion that is joined to the light guide plate and an incident potion on which light from the light source is incident, the prism causing the light incident on the incident potion to be incident on the light guide plate through the joining portion; a light receiving unit that receives scattered light of the light incident on the light guide plate, the scattered light being generated in response to the contact operation, and outputs light reception data, which is information representing a result of reception of the scattered light and used to detect the contact position; and a non-transmissive portion that covers a surface of the prism over a region excluding at least the joining portion and the incident potion, the non-transmissive portion blocking transmission of the light.

Advantageous Effects of Invention

According to the aspect of the present invention, the surface of the prism is covered with the non-transmissive portion over the region excluding at least the joining portion and the incident potion. Therefore, the risk that light other than the scattered light will leak from the surface of the prism and reach the light receiving unit can be reduced. Accordingly, a reduction in the contact-position detection accuracy can be reduced.

BRIEF DESCRIPTION OF DRAWINGS

FIG. 15B illustrates the state in which the light-source substrate is removed from the prism by using the removably attaching mechanism illustrated in FIG. 15A.

DESCRIPTION OF EMBODIMENTS

First Embodiment

An embodiment of the present invention will now be described.

Figure 1:
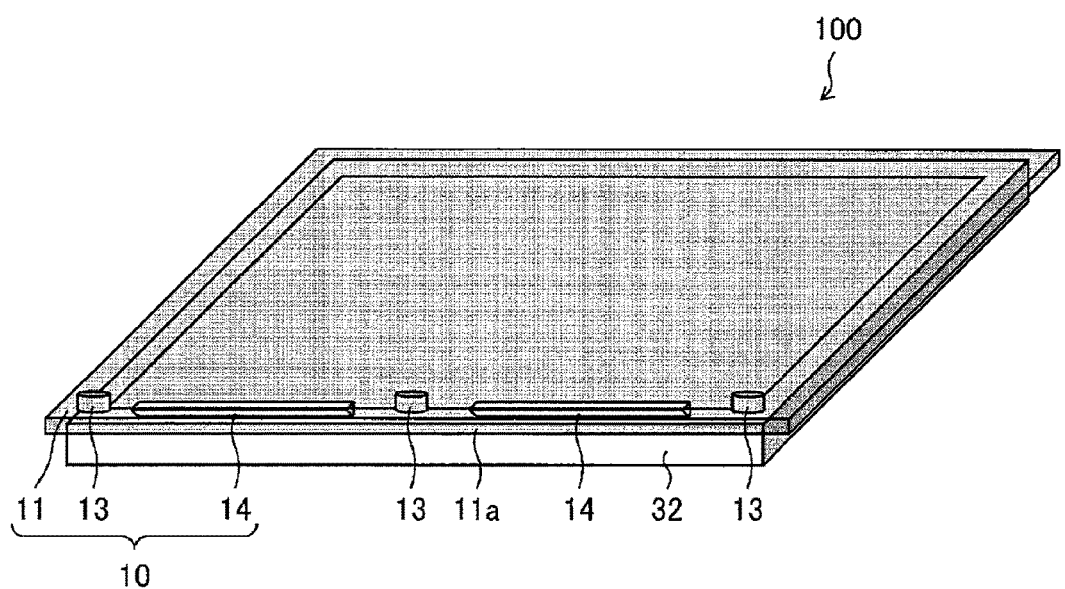
FIG. 1 is a schematic diagram illustrating the external structure a touch panel according to the present embodiment.
Figure 2:
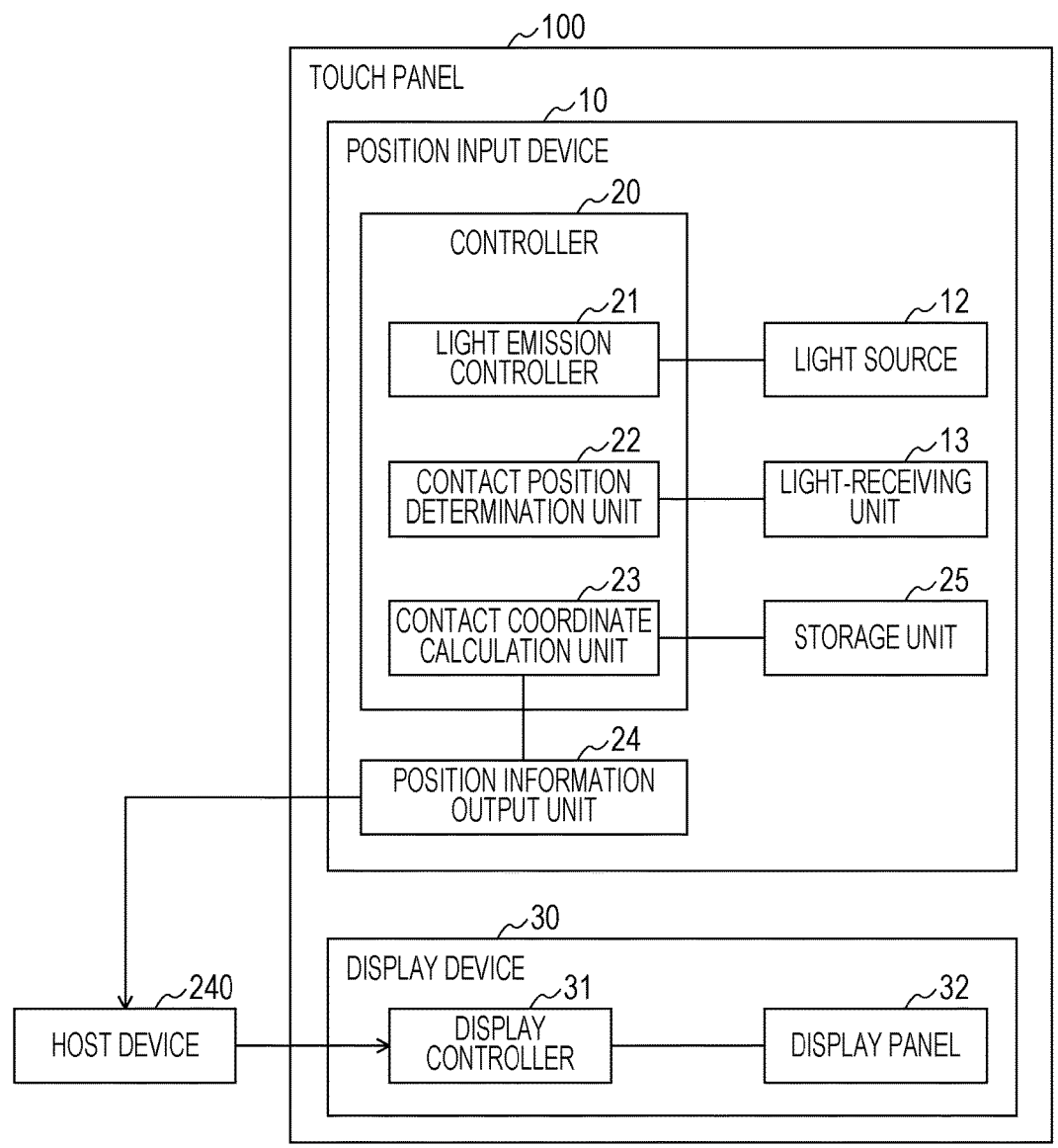
FIG. 2 is a schematic diagram illustrating the functional structure of the touch panel illustrated in FIG. 1.
Figure 3:
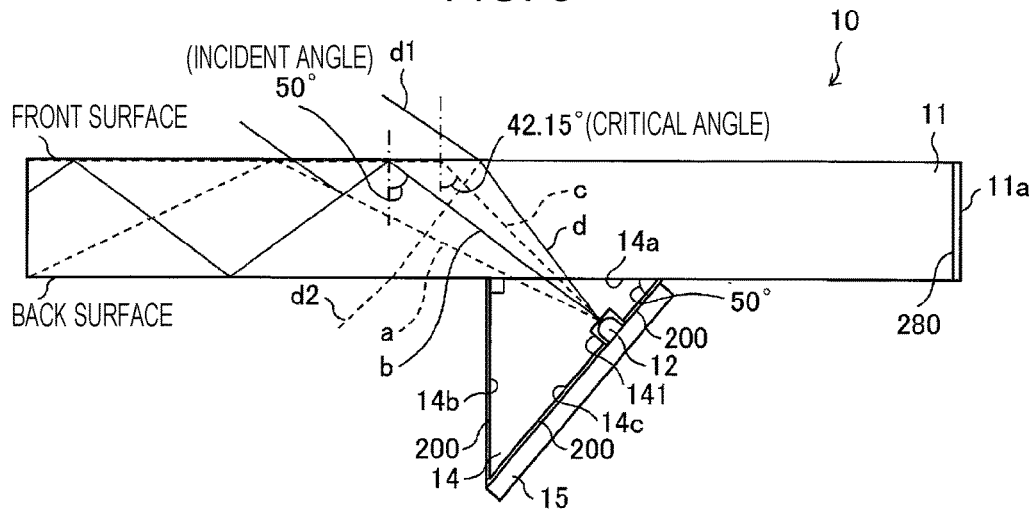
FIG. 3 is a schematic sectional view illustrating the external structure of a position input device included in the touch panel illustrated in FIG. 1.

FIG. 1 is a schematic diagram illustrating the external structure of a frustrated total internal reflection (FTIR) touch panel 100 according to the present embodiment. FIG. 2 is a schematic diagram illustrating the functional structure of the touch panel 100. FIG. 3 is a schematic sectional view illustrating the external structure of a position input device included in the touch panel illustrated in FIGS. 1 and 2.

The touch panel 100 is a device that detects a contact position of a contact operation performed by the user. The contact operation is an operation in which the user brings a detection target (contact body), such as his or her finger or a pen, to a front surface (contact surface) of a light guide plate 11 of the touch panel 100.

As illustrated in FIG. 2, the touch panel 100 includes a position input device 10 and a display device 30.

The display device 30 includes a display controller 31 and a display panel 32.

The display controller 31 controls the display state of the display panel 32 in accordance with image data input from a host device 240, which is connected to the touch panel 100.

The display panel 32 displays an image corresponding to an instruction issued by the display controller 31 on the display screen. There is no particular limitation regarding the display panel 32 as long as the display panel 32 has a function of displaying an image corresponding to the instruction issued by the display controller 31. For example, a liquid crystal display panel, a plasma display panel, or an organic EL display panel may be used as the display panel 32.

The host device 240 has a function of outputting the image data to the display device 30 and a function of receiving a signal from the position input device 10, the signal representing an input operation performed by the user on the image corresponding to the image data. The host device 240 may be, for example, a personal computer, a television set, or any type of image reproduction device. The host device 240 may be integrated with the touch panel 100. Alternatively, the host device 240 may be formed separately from the touch panel 100 and configured to communicate with the touch panel 100.

The position input device 10 is a device that enables the user to input information. More specifically, the position input device 10 enables the user to input information by performing a position specifying operation (above-described contact operation) by using the detection target (finger, pen, or the like).

Referring to FIG. 2, the position input device 10 includes light sources 12, light receiving units 13, a storage unit 25, a controller 20, and a position information output unit 24. As illustrated in FIGS. 1 and 3, the position input device 10 also includes a light guide plate 11, prisms 14, and light-source substrates 15. As illustrated in FIG. 2, the controller 20 includes a light emission controller 21, a contact position determination unit 22, and a contact coordinate calculation unit 23. The controller 20 may serve the function of the display controller 31.

The light guide plate 11 faces the display panel 32 so as to cover the display screen of the display panel 32, and causes light that has been emitted from the light sources 12 and incident on the light guide plate 11 through the prisms 14 to propagate through the light guide plate 11. In the present embodiment, the light guide plate 11 is made of an acrylic resin, and has a thickness of 2 mm. The material and thickness of the light guide plate 11 are not particularly limited, and various types of known light guide plates may be used.

Each light source 12 is a unit in which a plurality of light-emitting elements are arrayed in one direction (see FIGS. 3 and 5B), and is mounted on the corresponding light-source substrate 15. In the present embodiment, light emitting diodes (LEDs), which emit infrared light having a wavelength of 850 nm, are used as the light-emitting elements included in each light source 12.

As illustrated in FIG. 1, the shape of the light guide plate 11 when viewed in the direction normal to the front or back surface of the light guide plate 11 (shape of the surface with which the detection target comes into contact) is rectangular. Referring to FIGS. 1 and 3, each light source 12 is inserted in a groove 141 in the corresponding one of the prisms 14 disposed near one of the four sides that define the periphery of the rectangular light guide plate 11 (hereinafter referred to as an edge 11*a*). The light-emitting elements that constitute each light source 12 are arranged in a direction that is the same as the longitudinal direction of the edge 11*a* and that is parallel to the front or back surface of the light guide plate 11.

Here, the term "rectangular" is not limited to strictly rectangular shapes, and also includes substantially rectangular shapes. Therefore, a shape in which corners of a rectangle are chamfered and a shape in which recesses, projections, or cuts are formed at the sides of a rectangle (or in a region between the display region and the sides of the rectangle) are also included.

Figure 23:
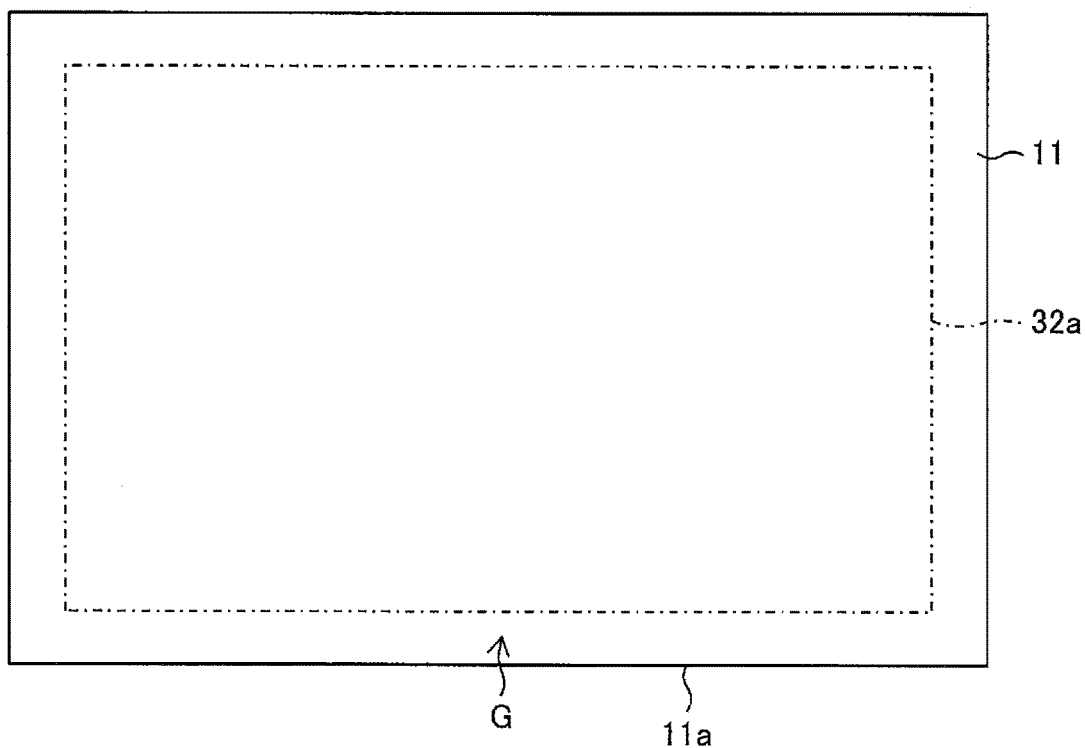
FIG. 23 is a first diagram illustrating the location at which the prism is arranged.
Figure 24:
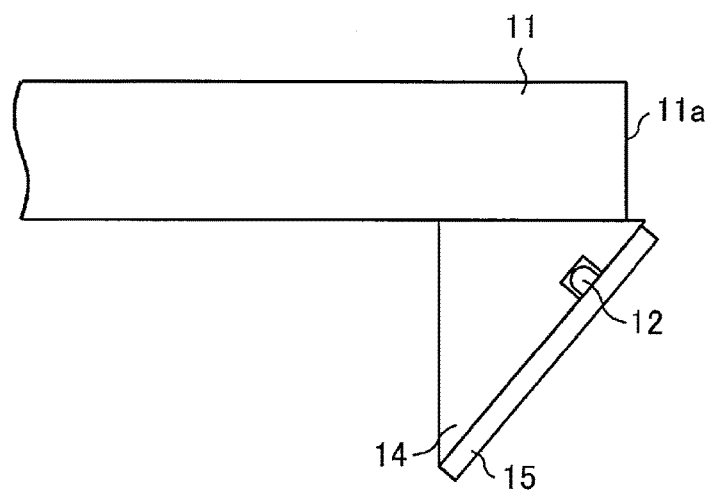
FIG. 24 is a second diagram illustrating the location at which the prism is arranged.

The "prisms 14 disposed near one side (edge 11*a*)" may be arranged such that (a) each prism 14 is in a region G (see FIG. 23) between the edge 11*a* of the light guide plate 11 and a display region 32*a* of the display panel 32 when viewed in the direction normal to the plate surfaces of the light guide plate 11; (b) each prism 14 is superposed on the edge 11*a* when viewed in the direction normal to the plate surfaces of the light guide plate 11 (see FIG. 24); or (c) each prism 14 is joined to the edge 11*a* (see FIG. 22). In the present embodiment, each prism 14 is bonded to the back surface of the light guide plate 11 in the region G illustrated in FIG. 23.

Figure 5A:
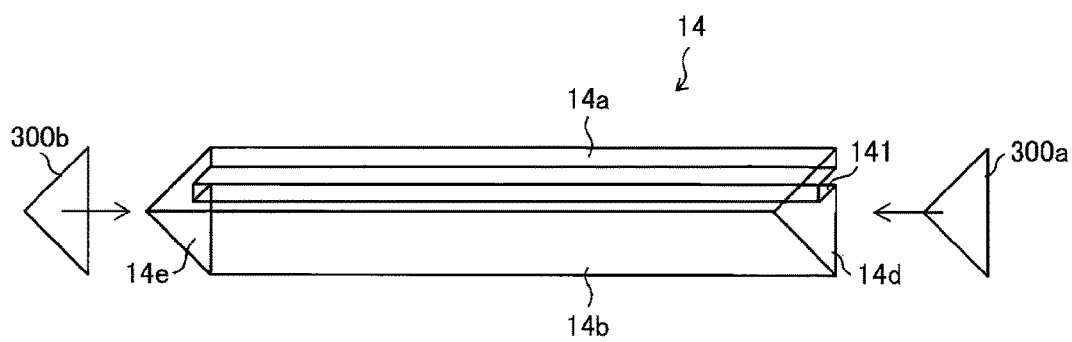
FIG. 5A is a schematic perspective view illustrating a prism attached to the touch panel illustrated in FIG. 1.
Figure 5B:
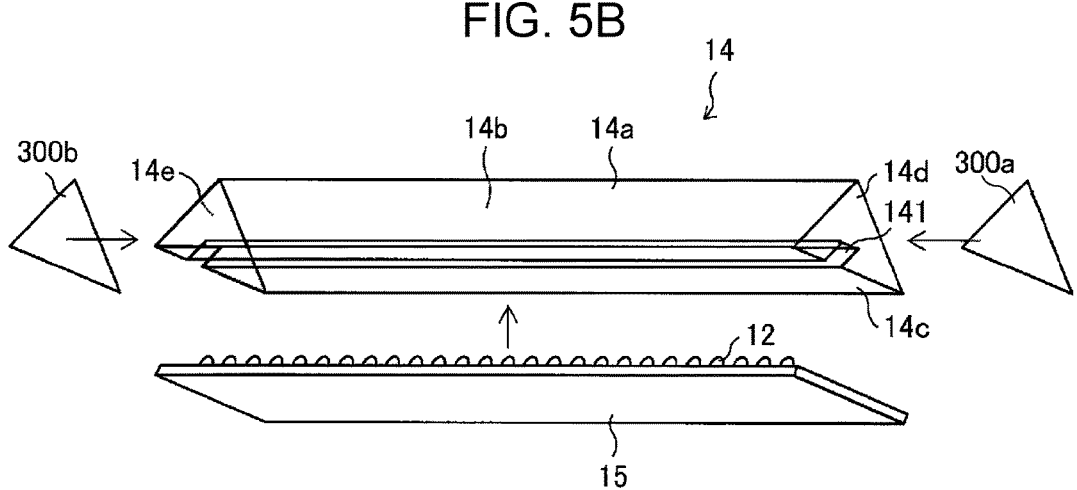
FIG. 5B is a schematic perspective view illustrating a portion of the prism attached to the touch panel illustrated in FIG. 1 that is different from the portion illustrated in FIG. 5A.

FIG. 5A is a schematic perspective view illustrating a prism. FIG. 5B is a schematic perspective view illustrating a portion of the prism other than the portion illustrated in FIG. 5A.

As illustrated in FIGS. 5A and 5B, each prism 14 is an optical member having the shape of a triangular prism with right triangular bottom surfaces. Although the prisms 14 are triangular-prism-shaped in the present embodiment, the prisms 14 may instead have the shape of a polygonal prism other than a triangular prism. The prisms 14 are preferably made of the same material as the light guide plate 11. Therefore, in the present embodiment, the prisms 14 are made of a transparent acrylic resin.

Here, the term "right triangular" is not limited to strictly right triangular shapes, and also includes substantially right triangular shapes. The term "shape of a triangular prism" is not limited to the shapes of strictly triangular prisms, and also includes the shapes of substantially triangular prisms. The term "shape of a polygonal prism" is not limited to the shapes of strictly polygonal prisms, and also includes the shapes of substantially polygonal prisms. Therefore, the prism 14 may have a shape in which, for example, corners and/or edges of a triangular prism are chamfered or the shape of a triangular prism having recesses, projections, or cuts on the surfaces thereof. As illustrated in FIGS. 3, 5A, and 5B, each prism 14 of the present embodiment includes the groove 141 for receiving the corresponding light source 12.

As illustrated in FIG. 3, each prism 14 includes side surfaces 14*a* and 14*b* that are perpendicular to each other and a side surface 14*c* that is at an acute angle relative the side surfaces 14*a* and 14*b*. The prism 14 is bonded to the back surface of the light guide plate 11 with an adhesive or a solvent in a region near an end of the light guide plate 11 in such a manner that the side surface 14*a* is parallel to the back surface of the light guide plate 11, the side surface 14*b* is perpendicular to the back surface of the light guide plate 11, the side surface 14*b* is adjacent to the central region of the light guide plate 11, and the side surface 14*c* is adjacent to the periphery (edge 11*a*) of the light guide plate 11. More specifically, as illustrated in FIGS. 1 and 3, the side surface 14*a* of the prism 14 and the back surface of the light guide plate 11 are joined together with an adhesive in such a manner that the bottom surfaces of the prism 14 are perpendicular to the front or back surface of the light guide plate 11 and to the direction in which the light-emitting elements that constitute the light source 12 are arranged.

The prism 14 needs to be bonded without leaving air bubbles in the bonding region. There is no particular limitation regarding the adhesive as long as the adhesive transmits light emitted from the light source 12, and a widely known optical adhesive or solvent may be used. However, preferably, an adhesive or solvent made of a material having a refractive index close to those of the light guide plate 11 and the prism 14 (for example, transparent acrylic-resin-based adhesive or solvent) is used. The prism 14 may be formed integrally with the light guide plate 11.

The above-described groove 141 is formed in the side surface 14*c*, and the light source 12 is inserted in the groove 141 so that the direction in which light is emitted from the light source 12 crosses the bottom portion of the groove 141.

Figure 6:
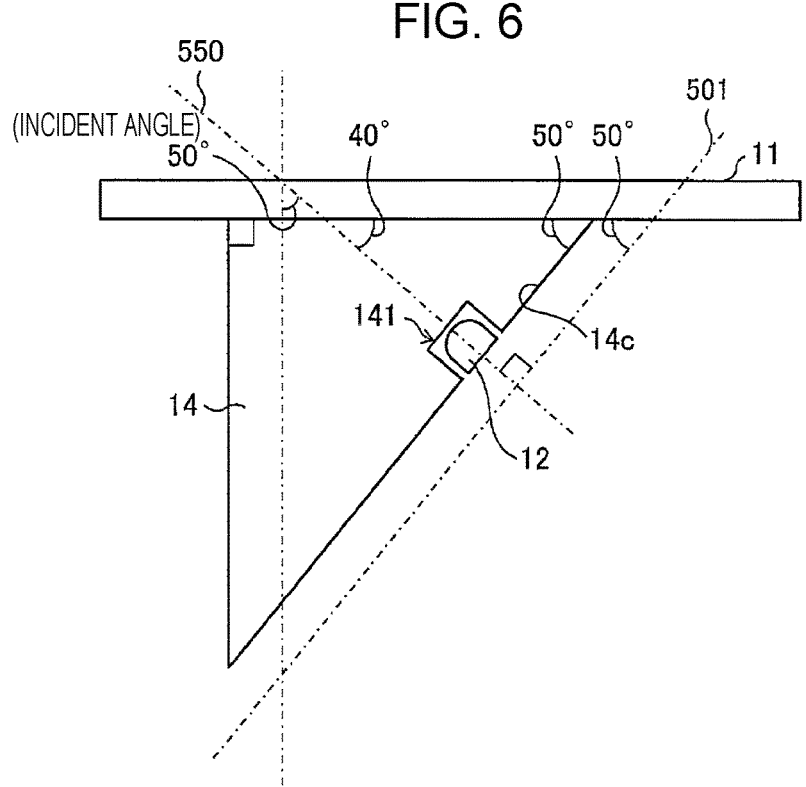
FIG. 6 is a schematic diagram illustrating the relationship between a light guide plate, the prism, and a principal axis direction of a light source in the touch panel illustrated in FIG. 1.

As illustrated in FIG. 6, the positional relationship and shapes of the light guide plate 11, the light source 12, and the prism 14 are determined so that the angle between a plane 501 parallel to the side surface 14*c* of the prism 14 and the back surface of the light guide plate 11 is 50° and so that the principal axis direction 550 of the light emitted from the light source 12 is perpendicular to the plane 501.

In the present embodiment, as illustrated in FIG. 3, plating 200 is formed on the surface of the prism 14 over a region excluding the side surface 14*a*, which is a joining portion that is joined to the light guide plate 11, and two side portions (141*b* in FIG. 11) and one bottom portion (141*a* in FIG. 11) of the groove 141. The plating 200 will be described in detail below.

In the above-described structure, as illustrated in FIG. 3, the light emitted from the light source 12 enters the prism 14 from the groove 141 in the prism 14, and travels through the prism 14. The light that travels through the prism 14 enters the light guide plate 11 through the side surface 14*a* of the prism 14, which is a joining portion that is joined to the light guide plate 11, and reaches the front surface of the light guide plate 11. At this time, in the present embodiment, the light emitted from the light source 12 in the principal axis direction is incident on the front surface of the light guide plate 11 at an incident angle of 50°, which is greater than 41.25°, which is the critical angle at the front surface of the light guide plate 11 (interface between the light guide plate and air). In the present embodiment, as described above, the light guide plate 11 is made of an acrylic resin (refractive index 1.49), and the critical angle at the interface between the light guide plate 11 and air is calculated as 42.15° from the Snell's law.

Light incident on the light guide plate 11 at an angle greater than the critical angle (see a and b in FIG. 3) is totally reflected by the front surface of the light guide plate 11, and propagates through the light guide plate 11 while being repeatedly totally reflected by the front and back surfaces of the light guide plate 11. Light incident on the light guide plate 11 at the critical angle (see c in FIG. 3) propagates along the front surface of the light guide plate 11. Light incident on the light guide plate 11 at an angle smaller than the critical angle (see d in FIG. 3) is divided; most part of the light (see d1 in FIG. 3) travels into the air from the front surface of the light guide plate 11, and other part (see d2 in FIG. 3) is reflected by the front surface of the light guide plate 11 and is emitted to the outside of the light guide plate 11 from the back surface.

Thus, in the present embodiment, the positional relationship, shapes, sizes, etc., of the light guide plate 11, the prism 14, and the light source 12 are determined in consideration of the directivity of the light emitted from the LEDs included in the light source 12 so that light emitted in the principal axis direction (direction in which the intensity of the emitted light is at a maximum; emission angle 0°) is incident on the front surface of the light guide plate 11 at an incident angle greater than the critical angle (50°). Accordingly, in the present embodiment, when the detection target (user's finger, pen, or the like) comes into contact with the light guide plate 11 (when the contact operation is performed), scattering of light occurs at the front surface of the light guide plate 11. The contact position of the detection target can be accurately detected by detecting the scattering of light.

Figure 4:
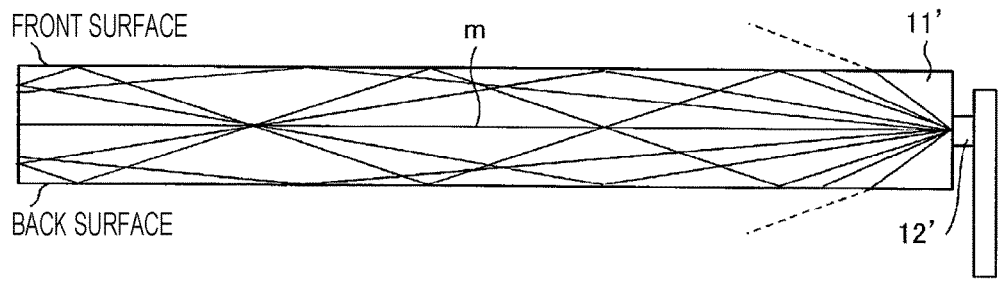
FIG. 4 is a schematic diagram illustrating paths of light emitted from a light source included in a touch panel according to a comparative example.

This will be described in more detail with reference to a comparative example illustrated in FIG. 4. FIG. 4 illustrates a touch panel in which a light source 12' faces an end surface (edge portion) of a light guide plate 11'. FIG. 4 shows paths of light in the case where light emitted from the light source 12' is incident on the end surface of the light guide plate 11' so that the principal axis direction of the light emitted from the light source 12' is parallel to the front (or back) surface of the light guide plate 11'. In the comparative example illustrated in FIG. 4, the light emitted from the light source 12' in the principal axis direction (see m in FIG. 4) is not reflected by the interface between the light guide plate 11' and air (is not incident on the front or back surface of the light guide plate 11'), but propagates through the light guide plate 11' linearly in a direction parallel to the front or back surface of the light guide plate 11' and reaches an end portion of the light guide plate 11' (end portion opposite to the end portion that faces the light source 12'). In this case, the intensity of light that propagates along the front surface of the light guide plate 11' decreases, and therefore the intensity of scattered light generated at the front surface of the light guide plate 11' when a detection target comes into contact with the light guide plate 11' also decreases. Accordingly, the contact-position detection accuracy decreases.

In contrast, in the present embodiment, as illustrated in FIG. 3, the light emitted from the light source 12 in the principal axis direction (direction in which the intensity of the emitted light is at a maximum; emission angle 0°) is incident on the front surface of the light guide plate 11 at an incident angle greater than the critical angle. Therefore, the intensity of the scattered light generated at the front surface of the light guide plate 11 when the detection target comes into contact with the light guide plate 11 is high. Accordingly, the contact-position detection accuracy can be increased.

The light receiving units 13 illustrated in FIG. 1 receive the scattered light generated when the user brings the detection target, such as his or her finger or a pen, into contact with the light guide plate 11. The light receiving units 13 generate an electric signal corresponding to the received light, and transmit the electric signal to the controller 20. In the present embodiment, as illustrated in FIG. 1, three light receiving units 13 are provided.

Figure 7:
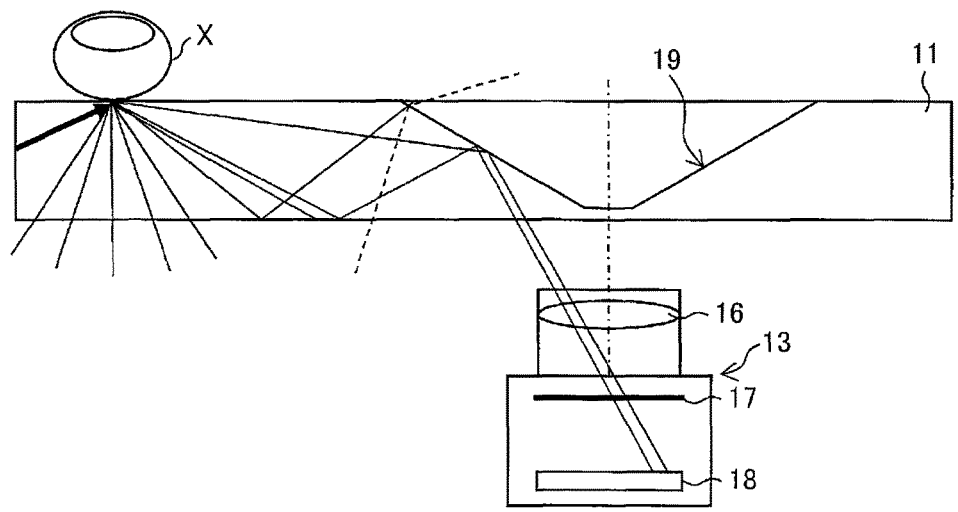
FIG. 7 is a schematic diagram illustrating the structure of a light receiving unit and the light guide plate included in the touch panel illustrated in FIG. 1.

FIG. 7 is a diagram illustrating the structures of each light receiving unit 13 and the light guide plate 11.

As illustrated in FIG. 7, each light receiving unit 13 includes a lens 16, a band-pass filter 17, and an imaging device 18. A conical recess 19, which narrows toward the back surface from the front surface of the light guide plate 11, is provided in the light guide plate 11 at a position corresponding to the light receiving unit 13.

As illustrated in FIG. 7, when the user performs a position input operation (contact operation) by bringing a detection target X (user's finger, pen, or the like) into contact with the front surface of the light guide plate 11, the light that propagates through the light guide plate 11 after being emitted from the light source 12 and incident on the light guide plate 11 scatters at the location at which the detection target X is in contact with the light guide plate 11. Part of the scattered light propagates through the light guide plate 11 again and reaches the recess 19, is reflected by the recess 19, and is incident on the light receiving unit 13.

The light incident on the light receiving unit (light detection camera) 13 is focused on an imaging surface of the imaging device 18 through the lens 16 and the band-pass filter 17, and is captured by the imaging device 18. Accordingly, bright-spot information of the scattered light (image data and light reception data) is generated.

As illustrated in FIG. 1, the light receiving units 13 and the prisms 14 are disposed near the edge 11a of the light guide plate 11. The prisms 14 are closer to the edge 11a than the light receiving units 13 are. The purpose of this arrangement is to exclude the joining portion of the prism 14 that is joined to the light guide plate 11 (side surface 14b) from the observation region (detection range) of the light receiving units 13.

Next, the light emission controller 21, the contact position determination unit 22, and the contact coordinate calculation unit 23, which are included in the controller 20 illustrated in FIG. 2, will be described.

The light emission controller 21 controls the operation of the light sources 12 to switch between an on-state in which light is emitted and an off-state in which light is not emitted.

The contact position determination unit (position detection unit) 22 determines the contact position at which the detection target has come into contact with the light guide plate 11 on the basis of the electric signals (bright-spot information) input from the light receiving units 13.

Figure 8:
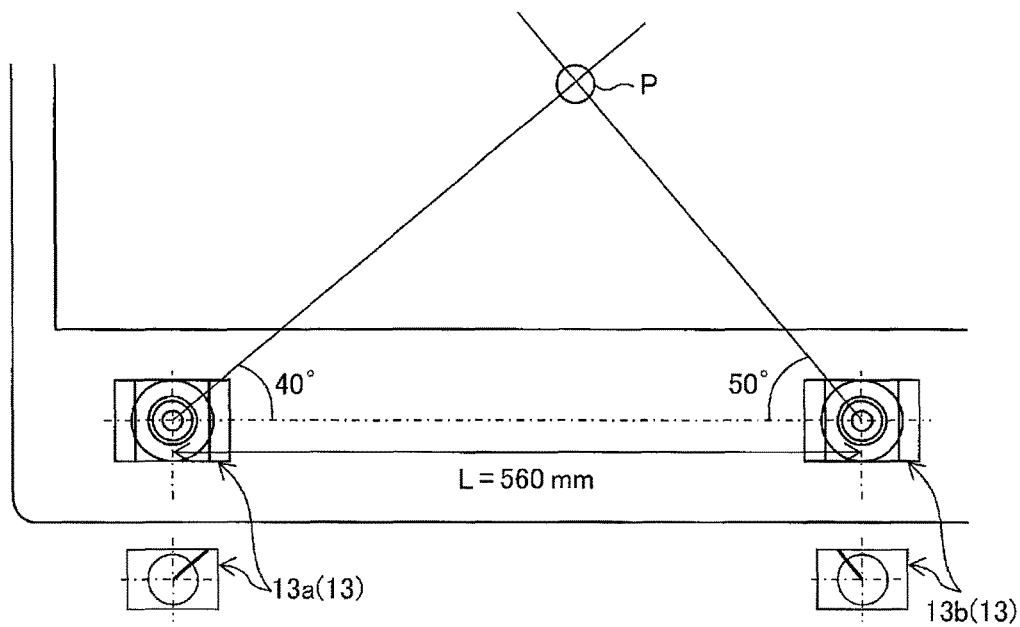
FIG. 8 illustrates the method for detecting a contact position of a detection target on the touch panel illustrated in FIG. 1.

FIG. 8 illustrates the method for detecting the contact position of the detection target (position input by the user).

When the detection target X comes into contact with the light guide plate 11, the light that propagates through the light guide plate 11 after being emitted from the light source 12 and incident on the light guide plate 11 scatters (see FIG. 7). The thus-generated scattered light is incident on each light receiving unit 13 and captured by the imaging device 18 of the light receiving unit 13, so that information regarding the angle of the contact position with respect to the light receiving unit 13 is obtained. Accordingly, the contact position is determined by the triangulation method from the angle information obtained by at least two light receiving units 13 selected from the three light receiving units 13.

For example, referring to FIG. 8, assume that the coordinates of the contact position are P (Xp, Yp), two of the three light receiving units 13 are light receiving units 13a and 13b, the incident angle of the scattered light on the light receiving unit 13a is α=40°, the incident angle of the scattered light on the light receiving unit 13b is β=50°, and the distance between the center of the imaging surface of the receiving unit 13a and the center of the imaging surface of the light receiving unit 13b is L=560 mm. In this case, Yp and Xp can be determined from L=Yp/tan α+Yp/tan β as follows:

$$Yp = L/(1/\tan\alpha + 1/\tan\beta)$$
$$= L \cdot \sin\alpha \cdot \sin\beta / \sin(\alpha + \beta)$$
$$= 560 \cdot \sin 40° \cdot \sin 50° / \sin(40° + 50°)$$
$$= 275.74$$

$$Xp = Yp/\tan\alpha$$
$$= 275.74/\tan 40°$$
$$= 328.61$$

Alternatively, data showing the relationship between the incident angles of the scattered light based on the imaging data generated by the imaging devices 18 of the light receiving units 13 and the position and angle on the coordinate system of the light guide plate 11 may be prepared in advance by performing, for example, calibration, and the prepared data may be used to determine the contact position.

The contact coordinate calculation unit 23 converts (corrects) the coordinates of the contact position on the light guide plate 11, which are determined by the contact position determination unit 22, into coordinates of the coordinate system on the display screen by using data that is stored in the storage unit 25 in advance and that shows the relationship between the coordinate system on the light guide plate 11 and the coordinate system on the display screen. Thus, an operation designation position (contact position) of the detection target X on the display screen, that is, the coordinate position in the coordinate system of the display screen corresponding to the contact position of the detection target on the light guide plate 11, is determined.

The position information output unit 24 outputs information (designation information) representing the coordinates of the operation designation position on the display screen, which are determined by the contact coordinate calculation unit 23, to the host device 240. The host device 240 determines the instruction issued by the user on the basis of the image displayed on the display screen and the contact position of the detection target X on the display screen.

The controller 20 illustrated in FIG. 2 is not necessarily included in the position information input device 20, and may instead be included in the host device 240 or in the display device 30. In other words, the host device 240 or the display device 30 may receive the bright-spot information from each light receiving unit 13 and determine the contact position of the detection target X on the basis of the bright-spot information.

In the touch panel according to the related art, the detection accuracy decreases due to light that leaks to the outside of the prism from the front surface of the prism and light that leaks instead of entering the prism after being emitted from the light source. In the present embodiment, the reduction in the detection accuracy is suppressed. This will now be described with reference to the drawings.

Figure 9:
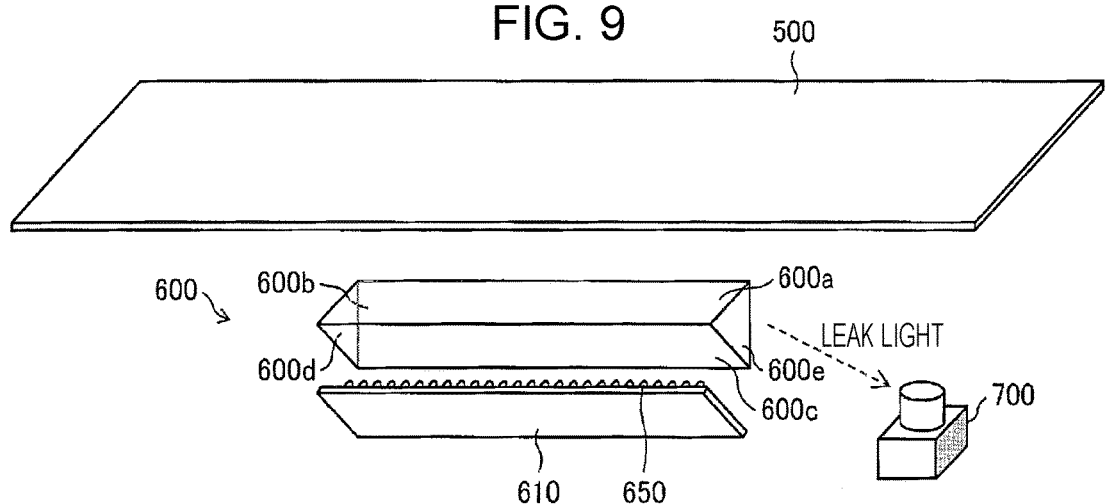
FIG. 9 is an exploded perspective view of the main part of a touch panel according to the related art, illustrating a problem of the related art.

FIG. 9 is an exploded perspective view of the main part of a touch panel according to the related art, illustrating the problem of the related art. Among the surfaces of a prism 600 illustrated in FIG. 9, a side surface 600a, which is parallel to the back surface of a light guide plate 500, is joined to the back surface of the light guide plate 500 (the surfaces are separated from each other in FIG. 9, but are joint together in practice). In addition, among the surfaces of the prism 600 illustrated in FIG. 9, a side surface 600b, which is perpendicular to the back surface of the light guide plate 500, and a side surface 600c, which is at an angle relative to the back surface, are exposed (exposed to air). Bottom surfaces 600d and 600e are also exposed.

The prism 600 does not have a groove for receiving a light source 650, and the light source 650 is mounted on a light-source substrate 610, which faces the side surface 600c with a gap provided therebetween. The side surface 600c serves as an incident potion on which light from the light source 650 is incident.

With the structure illustrated in FIG. 9, part of the light that travels through the prism 600 after being emitted from the light source 650 and entering the prism 600 is reflected by the joining portion of the prism 600 that is joined to the light guide plate 500 (side surface 600a) instead of passing through the joining portion. The reflected light leaks to the outside through the bottom surfaces 600d and 600e and the side surfaces 600b and 600c, and the leak light may reach a light receiving unit 700. In addition, part of the light that has reached the side surface 600c after being emitted from the light source 650 is reflected to the outside of the prism 600 instead of entering the prism 600. This light may also reach the light receiving unit 700.

In such a case, the light receiving unit 700 receives light other than the scattered light generated when a detection target comes into contact with the light guide plate 500, and accordingly the detection accuracy of the light receiving unit 700 decreases. In addition, the amount of light that propagates through the light guide plate 500 decreases. Thus, a loss in the amount of light occurs.

The present embodiment addresses the above-described problem by modifying the light paths to the light guide plate 11. This will be described in detail below.

As illustrated in FIGS. 3 and 5, each prism 14 of the present embodiment includes the side surface 14a, which is parallel to the back surface of the light guide plate 11, the side surface 14b, which is perpendicular to the back surface of the light guide plate 11, and the side surface 14c, which is at an angle relative to the back surface of the light guide plate 11.

As illustrated in FIG. 3, the side surface 14a of the prism 14 serves as the joining portion that is joined to the back surface of the light guide plate 11.

As illustrated in FIGS. 3, 5A, 5B, and 6, the side surface 14c of the prism 14 has the recessed groove (recess) 141 that extends in the direction in which the light-emitting elements that constitute the light source 12 are arranged (direction parallel to the edge 11a). As illustrated in FIG. 5B, the groove 141 is formed so as to extend from one bottom surface (first bottom surface) 14d to the other bottom surface (second bottom surface) 14e (the bottom surfaces 14d and 14e are also cut).

Figure 11:
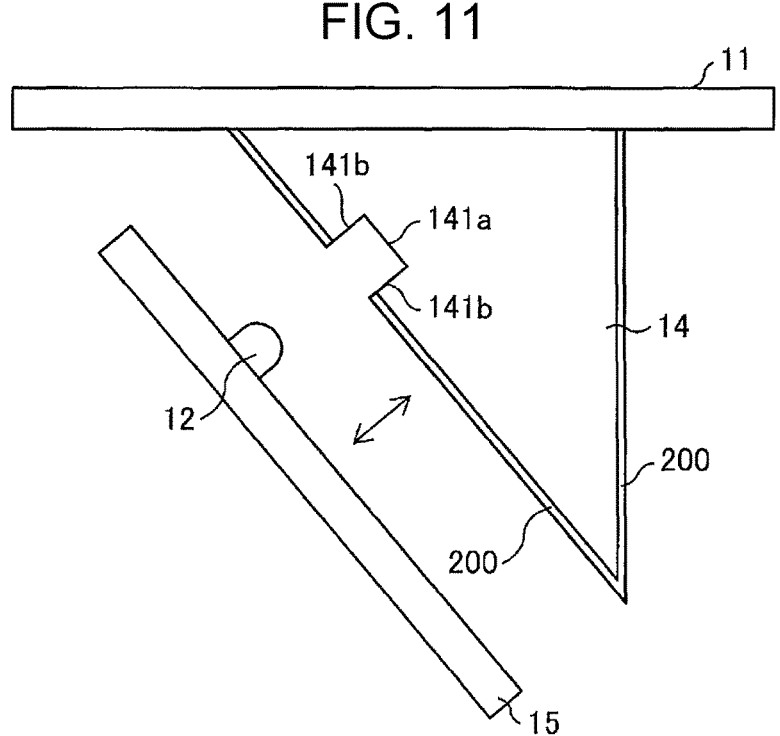
FIG. 11 illustrates a touch panel in which a light-source substrate is removably attachable to the prism.

In addition, as illustrated in FIG. 3, each prism 14 of the present embodiment has the plating 200 formed on the surfaces thereof other than the side surface 14a, which is the joining portion that is joined to the light guide plate 11, and the wall surface of the groove 141 in which the light source 12 is inserted. More specifically, among the surfaces of the prism 14, no plating is formed on the side surface 14a illustrated in FIGS. 5A and 5B and the wall surface of the groove 141, and the plating 200 is formed on the side surfaces 14b and 14c and the bottom surfaces 14d and 14e. As illustrated in FIG. 11, the wall surface of the groove 141 includes the bottom portion 141a and the side portions 141b, and no plating is formed on both the bottom portion 141a and the side portions 141b.

Surfaces of the plating 200 that are in close contact with the surfaces of the prism 14 (interfaces between the plating 200 and the prism 14) serve as reflective surfaces that reflect light. The material of the plating 200 may be, for example, silver, aluminum, or trivalent chromium. The prism 14 may be plated by a well-known plating method, such as vapor deposition, chemical plating, electric plating, or spraying.

In addition, as illustrated in FIGS. 3 and 5B, the light-source substrate 15, which is made of a light-blocking material, is attached to the plated side surface 14c of the prism 14. More specifically, the light-source substrate 15 is in close contact with the side surface 14c over the entire region of the side surface 14c in such a manner that the light source 12 is inserted in the groove 141 and part of the groove 141 that is near the side surface 14c and the side surface 14c are covered (sealed) by the light-source substrate 15.

Furthermore, as illustrated in FIGS. 5A and 5B, a cover (first cover member) 300a is bonded to the plated bottom surface 14d of the prism 14. Similarly, a cover (second cover member) 300b is bonded to the plated bottom surface 14e of the prism 14. More specifically, the cover 300a is in close contact with the bottom surface 14d so that the entire region of the bottom surface 14d and a portion of the groove 141 formed in the bottom surface 14d (recess) are covered (sealed). Similarly, the cover 300b is in close contact with the bottom surface 14e so that the entire region of the bottom surface 14e and a portion of the groove 141 formed in the bottom surface 14e (recess) are covered (sealed). The covers (cover members) 300a and 300b are composes of plated acrylic plates that reflect light.

The side surface 14a of the prism 14, which is not plated, is joined to the back surface of the of the light guide plate 11. As illustrated in FIG. 1, the touch panel 100 of the present embodiment includes two prisms 14, each having the above-described structure.

As illustrated in FIG. 3, among the peripheral edges of the light guide plate 11, the peripheral edge near the prisms 14 (edge 11a) has a reflecting portion (second reflecting portion) 280 formed thereon. When light that propagates through the light guide plate 11 is incident on the reflecting portion 280, the reflecting portion 280 reflects the incident light toward the inside of the light guide plate 11.

With the above-described structure, the surfaces of each prism 14 other than the side surface 14a, which is the joining portion that is joined to the light guide plate 11, and the groove 141, which receives the light from the light source 12, are covered with the plating 200. The plating 200 functions as a non-transmissive portion (light block section) that does not transmit light. Therefore, the risk that light other than the scattered light from the light guide plate 11 will be emitted from a surface of the prism 14 and reach each light receiving unit 13 can be reduced. Accordingly, a reduction in the contact-position detection accuracy can be suppressed.

In particular, in the present embodiment, light that has reached the plating 200 from the inside of the prism 14 is reflected toward the inside of the prism 14 by the plating (first reflecting portion) 200. Therefore, not only the leakage of light from the prism 14 but also a reduction in the amount of light that travels from the prism 14 to the light guide plate 11 can be suppressed. Accordingly, loss in the amount of light can be reduced.

In addition, according to the present embodiment, since the light source 12 is surrounded by the wall surface of the groove 141 in the prism 14, the light emitted from the light source 12 can be efficiently delivered to the prism 14.

As illustrated in FIGS. 3 and 11, the wall surface of the groove 141 includes the bottom portion 141a and the side portions 141b. Although most part of the light emitted from the light source 12 enters the prism 14 through the bottom portion 141a, small part of the emitted light is reflected by the bottom portion 141a. However, in the present embodiment, since the side portions 141b that are perpendicular to the bottom portion 141a are provided as illustrated in FIG. 11, the light reflected by the bottom portion 141a reaches the side portions 141b and enters the prism 14 through the side portions 141b. In other words, even when light is reflected by the bottom portion 141a, loss in the amount of light can be reduced since the reflected light enters the prism 14 through the side portions 141b.

In addition, as illustrated in FIG. 3, a portion of the groove 141 near the side surface 14c is covered by the light-source substrate 15, which blocks light. Therefore, leakage of light from the portion of the groove 141 near the side surface 14c can be suppressed. Furthermore, as illustrated in FIGS. 5A and 5B, portions of the groove 141 near the bottom surfaces 14d and 14e of the prism 14 are covered by the covers 300a and 300b, and therefore light leakage from these portions can also be suppressed.

In addition, according to the present embodiment, since the reflecting portion 280 is provided at the edge 11a of the light guide plate 11 (see FIG. 3), leakage of light from the light guide plate 11 can be suppressed. Accordingly, loss in the amount of light can be reduced.

Figure 10A:
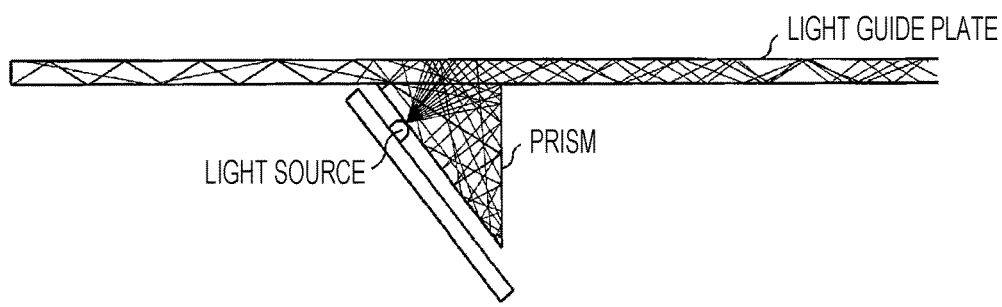
FIG. 10A shows the results of simulation of paths of light emitted from a light source included in a touch panel according to the related art.
Figure 10B:
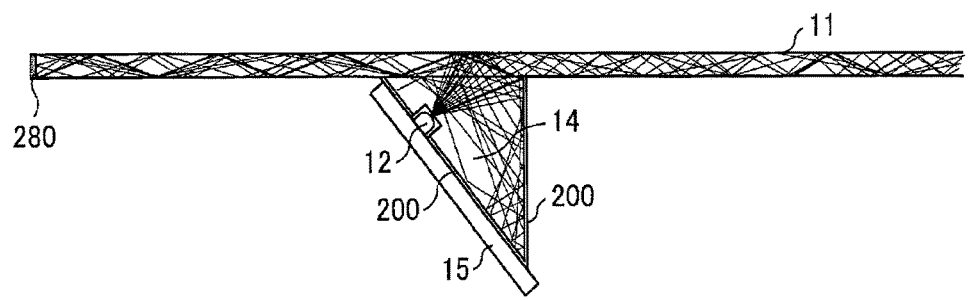
FIG. 10B shows the results of simulation of paths of light emitted from the light source included in the touch panel illustrated in FIG. 1.

FIG. 10A shows the results of simulation performed by the optical-path tracking method regarding light emitted from a light source of a touch panel according to the related art. FIG. 10B shows results of simulation performed by the optical-path tracking method regarding light emitted from the light source of the touch panel 100 according to the present embodiment. In the related art illustrated in FIG. 10A, no plating is formed on the prism, and the surfaces of the prism (excluding the surface joined to a light guide plate) are exposed. In addition, in the related art illustrated in FIG. 10A, no groove for receiving the light source is formed in the prism, and the light-source substrate and the prism are separated from each other. In addition, in the related art illustrated in FIG. 10A, no member corresponding to the reflecting portion 280 according to the present embodiment is provided.

FIGS. 10A and 10B show that the amount of light that propagates through the light guide plate is greater in the touch panel 100 according to the present embodiment than in the touch panel according to the related art. This clearly shows that loss in the amount of light is smaller in the structure of the present embodiment than in the structure of the related art.

In the above-described embodiment, the prisms 14 made of a transparent acrylic resin are used. However, prisms made of a material other than resin may, of course, instead be used. For example, prisms made of high transmission glass in which the content of iron oxide component is suppressed (for example, PYREX (registered trademark)) may be used. In the present embodiment, prisms made of a transparent acrylic resin are used in consideration of factors such as infrared light transmittance, workability, and cost.

In the above-described embodiment, the surfaces of each prism 14 are covered with the plating 200. However, the member that covers the surfaces of each prism 14 is not limited to the plating 200. For example, the prism 14 may instead be inserted in a case (reflecting member) formed of a thin aluminum plate so that light that leaks from the surfaces of the prism 14 is reflected toward the inside of the prism 14 by the case. However, in this case, the case is required to have openings at which the groove 141 and the side surface 14a (joining portion) are exposed.

The member that covers the surfaces of each prism 14 is not limited to the plating 200 or the reflecting member, such as the case formed of a thin aluminum plate, as long as the surfaces of the prism 14 excluding the groove 141 and the side surface 14a (joining portion) are covered with a material that does not transmit light. For example, the surfaces of the prism 14 excluding the groove 141 and the side surface 14*a* (joining portion) may be covered with a light-blocking member (non-transmissive portion) such as black tape. Also in such a structure, the light emitted from the light source 12 enters the light guide plate 11 through the prism 14, and the risk that light other than the scattered light from the light guide plate 11 will be emitted from a surface of the prism 14 and reach each light receiving unit 13 can be reduced (reduction in the contact-position detection accuracy can be suppressed).

In addition, although plated acrylic plates are used as the covers 300*a* and 300*b* that cover the bottom surfaces 14*d* and 14*e* of each prism 14 in the above-described embodiment, the covers 300*a* and 300*b* are not limited to the acrylic plates. The material of the covers 300*a* and 300*b* is not limited to a reflective material, such as plating, as long as the material does not transmit light (so that leakage of light can be suppressed). For example, light-blocking members, such as black-coated acrylic plates or pieces of black tape, may be used as the covers 300*a* and 300*b*. However, the reflective plating is preferred over the above-mentioned light-blocking members from the viewpoint of light amount efficiency. Therefore, in the present embodiment, the covers 300*a* and 300*b* composed of plated acrylic plates are used.

Although each prism 14 is joined to the back surface of the light guide plate 11 in the present embodiment, the portion to which each prism 14 is joined is not limited to the back surface of the light guide plate 11. For example, as illustrated in FIG. 22, each prism 14 may be attached to an end portion (edge) of the light guide plate 11.

Figure 22:
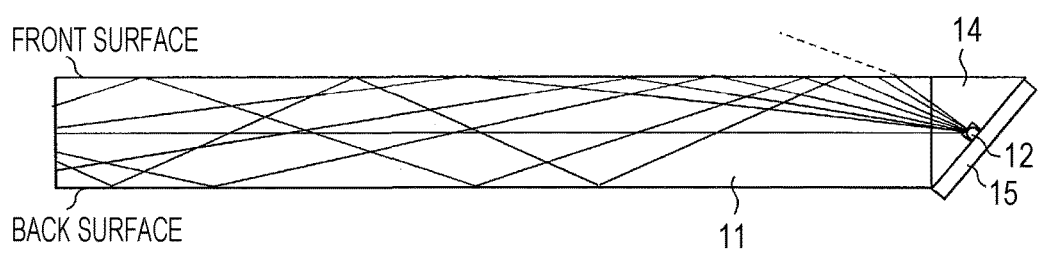
FIG. 22 illustrates the structure in which the prism is attached to an edge of the light guide plate.

The structure in which each prism 14 is joined to the back surface of the light guide plate 11 (FIGS. 1 and 3) is advantageous over the structure illustrated in FIG. 22. Therefore, in the present embodiment, the structure in which each prism 14 is joined to the back surface of the light guide plate 11 is employed. The advantages of this structure are as follows. That is, in the structure illustrated in FIG. 1, it is not necessary to arrange the light sources and the prisms outside the light guide plate, and therefore the size of the device can be reduced. In the case where each prism 14 is attached to an end portion of the light guide plate 11 as illustrated in FIG. 22, the process of bonding each prism 14 to the light guide plate (bonding process) is difficult, and an acute corner of the prism 14 is exposed. Therefore, there is a risk of injury and damage to the prism 14 during assembly. However, in the structure illustrated in FIG. 1, the light guide plate 11 can be easily processed, and such a risk can be reduced. In addition, in the structure illustrated in FIG. 22, the light source 12 is easily displaced when the light guide plate 11 is warped or deflected. However, in the structure illustrated in FIG. 1, the light source 12 is not easily displaced even when the light guide plate 11 is warped or deflected.

Second Embodiment

In the first embodiment, as illustrated in FIG. 3, the light-source substrate 15, which is made of a light-blocking material, is in close contact with the plated side surface 14*c* of each prism 14. Here, leakage of light from a portion of the side surface 14*c* of the prism 14 that is in close contact with the light-source substrate 15 can be suppressed due to the light-source substrate 15 even when this portion is not plated.

Accordingly, in the second embodiment, the plating 200 is formed on the surfaces of the prism 14 excluding the side surface 14*a*, which is the joining portion that is joined to the light guide plate 11, the wall surface of the groove 141 in which the light source 12 is inserted, and a portion of the side surface 14*c* that is in close contact with the light-source substrate 15. Also in this case, the risk that light other than the scattered light generated by the light guide plate 11 when the detection target comes into contact with the light guide plate 11 will leak from a surface of the prism 14 and reach the light receiving unit 13 can be reduced, and a reduction in the position detection accuracy can be suppressed.

Third Embodiment

When scattering of light occurs on the wall surface of the groove 141, the amount of light incident on the prism 14 decreases. Accordingly, the wall surface of the groove 141 is preferably polished. More specifically, as illustrated in FIG. 11, the wall surface of the groove 141 includes the bottom portion 141*a* and the side portions 141*b*, and the bottom portion 141*a* and the side portions 141*b* are preferably polished. In such a case, the occurrence of scattering of light on the wall surface of the groove 141 is reduced, and a reduction in the amount of light incident on the prism 14 can be suppressed.

Fourth Embodiment

Figure 12:
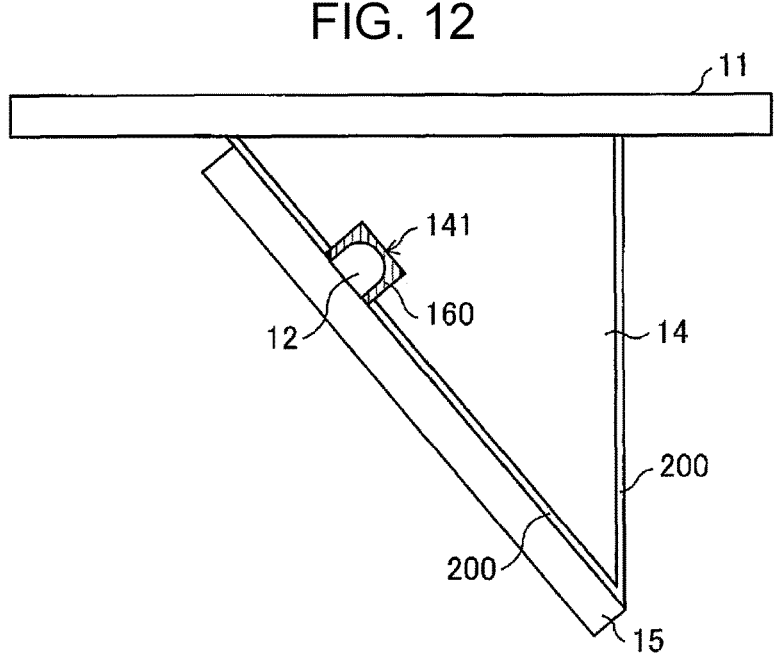
FIG. 12 illustrates a touch panel in which a gap between a wall surface of a groove in the prism and the light source is filled with a resin.

As illustrated in FIG. 12, the gap between the wall surface of the groove 141 and the light source 12 may be filled with a transparent resin 160. The transparent resin 160 may be, for example, silicone resin (silicone grease) or acrylic-based adhesive, and preferably has a refractive index close to that of the prism 14.

In the case where the gap is filled with the transparent resin 160 as illustrated in FIG. 12, even when the wall surface of the groove 141 is not polished as in the third embodiment, the occurrence of scattering of light on the wall surface of the groove 141 can be reduced and a reduction in the amount of light incident on the prism 14 can be suppressed. The fourth embodiment, in which the wall surface of the groove 141 is not polished and the gap is filled with the transparent resin 160, is advantageous over the third embodiment, in which the wall surface of the groove 141 is polished, in that the manufacturing process of the prism can be simplified.

However, in the structure illustrated in FIG. 12 in which the gap is filled with the transparent resin 160, the light-source substrate 15 cannot be easily removed from the prism 14 because the light source 12 and the prism 14 are bonded to the transparent resin 160. In contrast, in the structure of the third embodiment illustrated in FIG. 11, the light-source substrate 15 can be easily removed from the prism 14.

Fifth Embodiment

A removably attaching mechanism for removably attaching the light-source substrate 15 to the prism 14 is necessary to enable the light-source substrate 15 to be removed from the prism 14 as illustrated in FIG. 11. In the present embodiment, the removably attaching mechanism will be described.

Figure 13A:
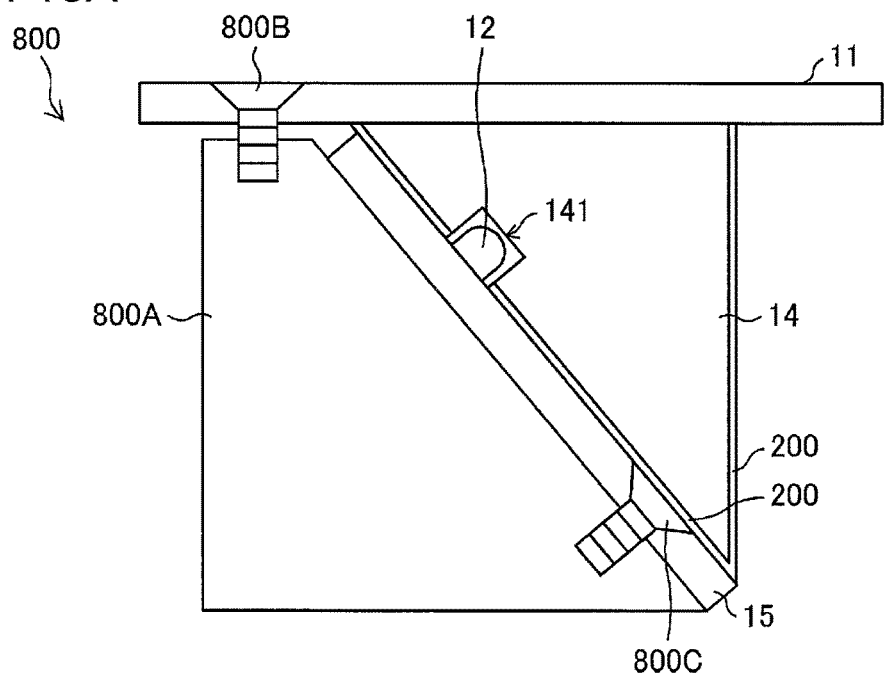
FIG. 13A illustrates a first example of a removably attaching mechanism for removably attaching the light-source substrate to the prism.
Figure 13B:
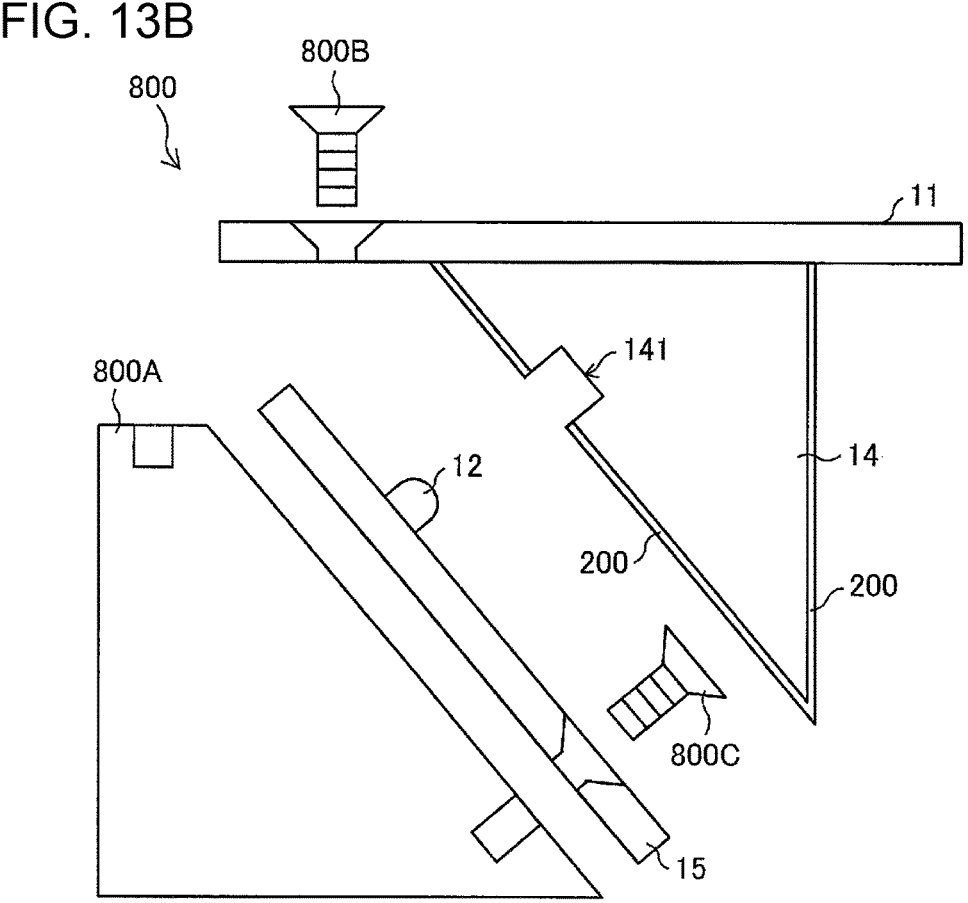
FIG. 13B illustrates the state in which the light-source substrate is removed from the prism by using the removably attaching mechanism illustrated in FIG. 13A.

FIG. 13A illustrates a first example of the removably attaching mechanism for removably attaching the light-source substrate 15 to the prism 14. FIG. 13B illustrates the state in which the light-source substrate 15 is removed from the prism 14 by using the removably attaching mechanism illustrated in FIG. 13A.

FIGS. 13A and 13B illustrate a removably attaching mechanism 800 including a fixing unit 800A made of an acrylic resin, a screw 800B for fastening the light guide plate 11 to the fixing unit 800A, and a screw 800C for fastening the light-source substrate 15 to the fixing unit 800A. The fixing unit 800A is coated so as to have mat black surfaces.

In the structure illustrated in FIGS. 13A and 13B, the light-source substrate 15 on which the light source 12 is mounted can be easily removed from the prism 14 by removing the screws 800B and 800C. Since the fixing unit 800A is coated so as to have mat black surfaces, reflection of light by the fixing unit 800A can be reduced.

Figure 14A:
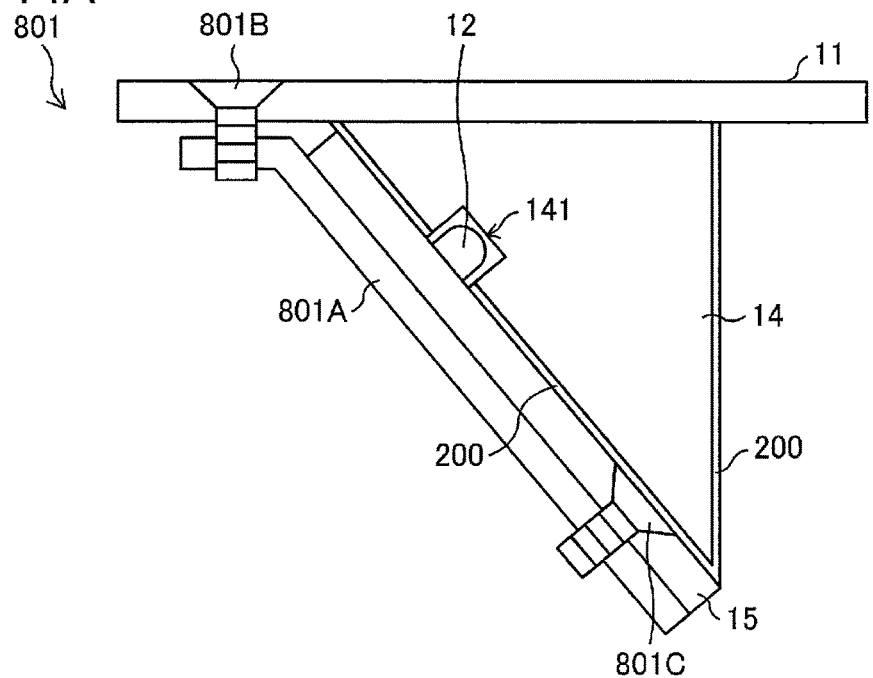
FIG. 14A illustrates a second example of a removably attaching mechanism for removably attaching the light-source substrate to the prism.
Figure 14B:
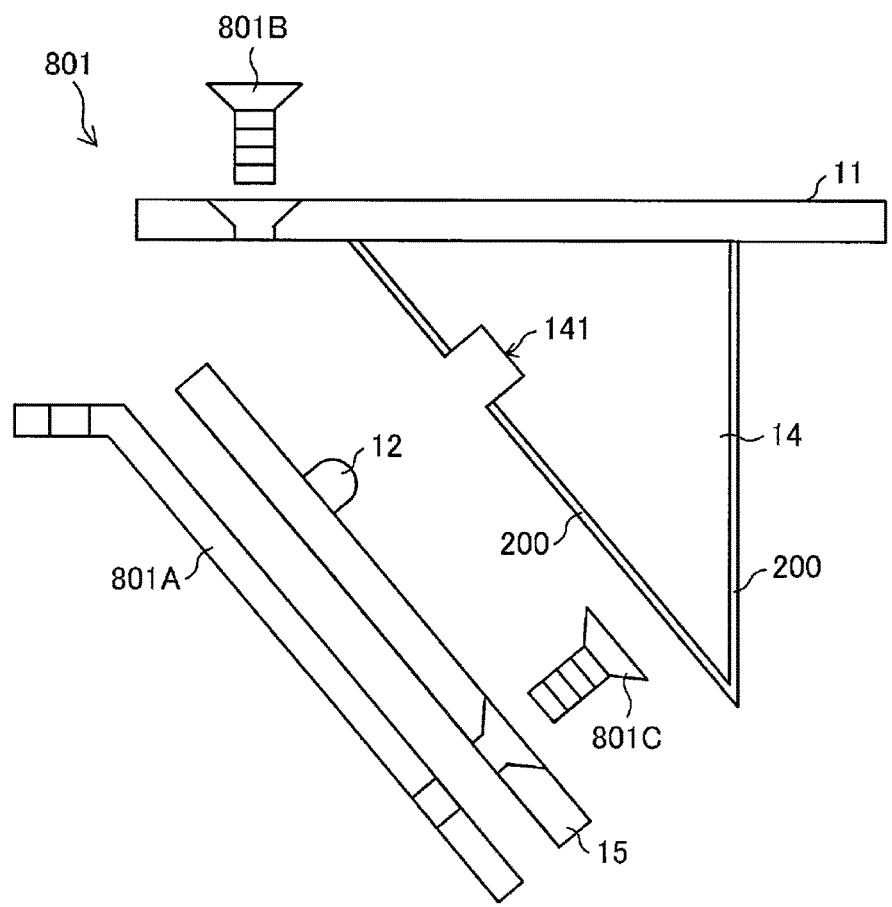
FIG. 14B illustrates the state in which the light-source substrate is removed from the prism by using the removably attaching mechanism illustrated in FIG. 14A.

FIG. 14A illustrates a second example of the removably attaching mechanism for removably attaching the light-source substrate 15 to the prism 14. FIG. 14B illustrates the state in which the light-source substrate 15 is removed from the prism 14 by using the removably attaching mechanism illustrated in FIG. 14A.

FIGS. 14A and 14B illustrate a removably attaching mechanism 801 including a metal plate 801A, a screw 801B for fastening the light guide plate 11 to the metal plate 801A, and a screw 801C for fastening the light-source substrate 15 to the metal plate 801A. The metal plate 801A is dyed in black.

In the structure illustrated in FIGS. 14A and 14B, the light-source substrate 15 on which the light source 12 is mounted can be easily removed from the prism 14 by removing the screws 801B and 801C. Since the metal plate 801A is dyed in black, reflection of light by the metal plate 801A can be reduced. In the case where the metal plate 801A is made of aluminum, the metal plate 801A is black anodized instead of being dyed in black.

Figure 15A:
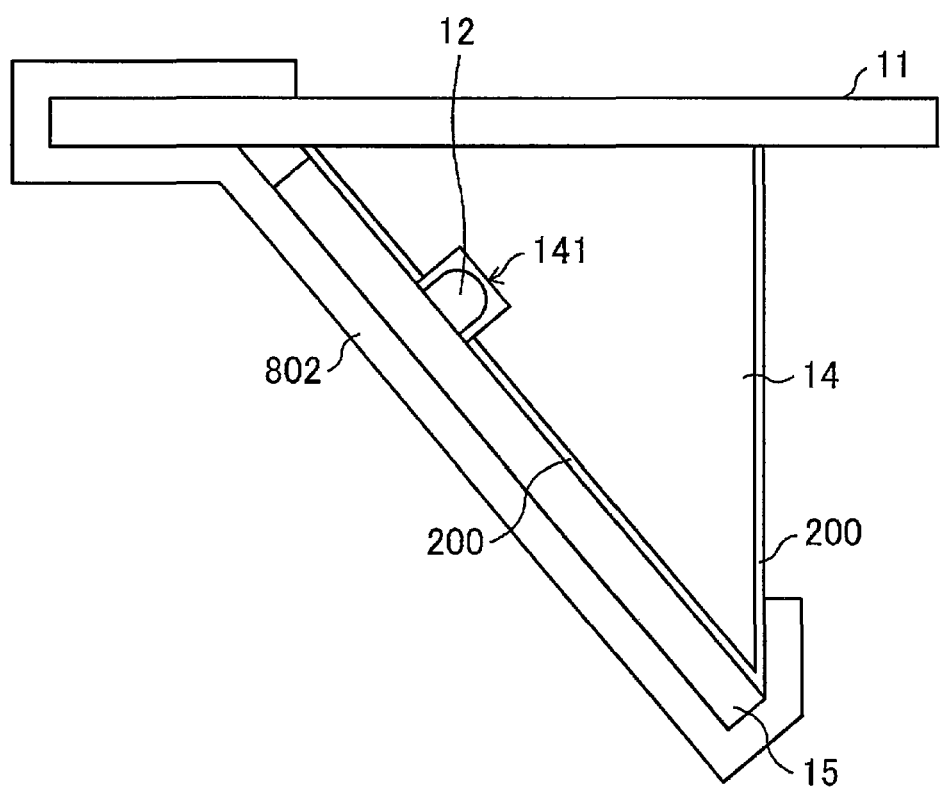
FIG. 15A illustrates a third example of a removably attaching mechanism for removably attaching the light-source substrate to the prism.

FIG. 15A illustrates a third example of the removably attaching mechanism for removably attaching the light-source substrate 15 to the prism 14. FIG. 15B illustrates the state in which the light-source substrate 15 is removed from the prism 14 by using the removably attaching mechanism illustrated in FIG. 15A.

FIGS. 15A and 15B illustrate a removably attaching mechanism 802 formed of a metal plate that is dyed in black. The removably attaching mechanism 802 includes a groove 802A that retains the light guide plate 11 by receiving a portion of the light guide plate 11; an inclined portion 802B on which the light-source substrate 15 is placed; and a receiving portion 802C that stands on the inclined portion 802B and supports the light-source substrate 15.

In the structure according to FIGS. 15A and 15B, the light-source substrate 15 on which the light source 12 is mounted can be easily removed from the prism 14. In addition, unlike the structures illustrated in FIGS. 13A and 14A, no screws are necessary. In the case where the removably attaching mechanism 802 is made of aluminum, the removably attaching mechanism 802 is black anodized instead of being dyed in black.

Figure 16:
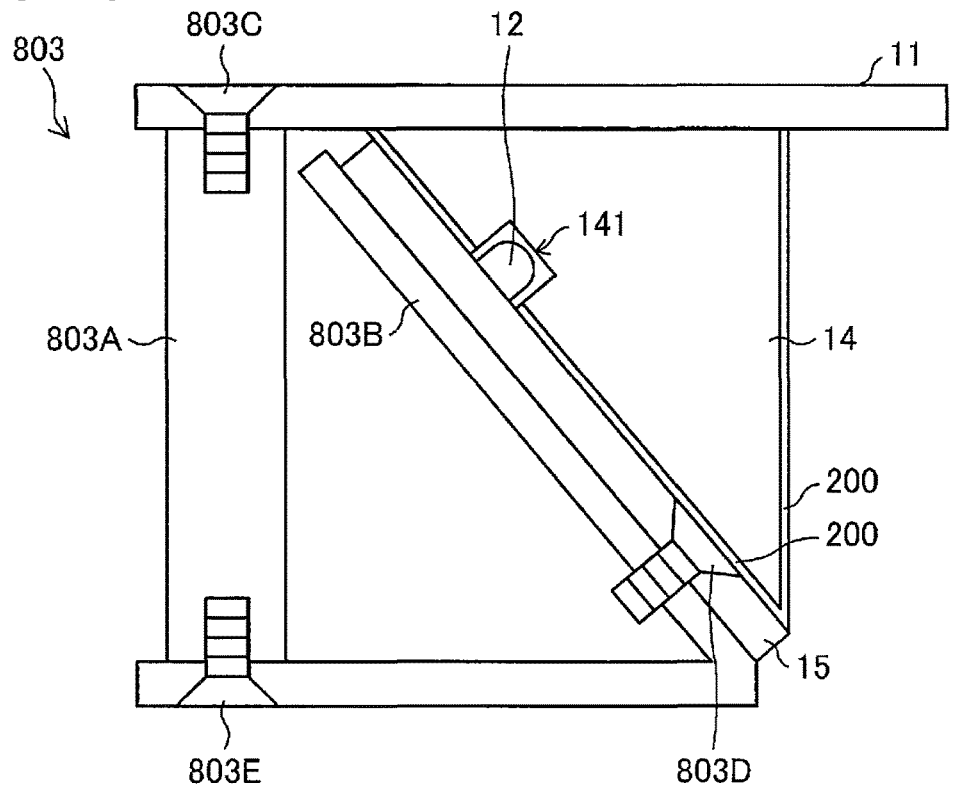
FIG. 16 illustrates a fourth example of a removably attaching mechanism for removably attaching the light-source substrate to the prism.

FIG. 16 illustrates a fourth example of the removably attaching mechanism for removably attaching the light-source substrate 15 to the prism 14. FIG. 16 illustrates a removably attaching mechanism 803 including a fixing unit 803A made of an acrylic resin, a metal plate 803B, a screw 803C for fastening the light guide plate 11 to the fixing unit 803A, a screw 803D for fastening the light-source substrate 15 to the metal plate 803B, and a screw 803E for fastening the metal plate 803B to the fixing unit 803A. The fixing unit 803A is coated so as to have mat black surfaces. The metal plate 803B is dyed in black. In the case where the metal plate 803B is made of aluminum, the metal plate 803B is black anodized instead of being dyed in black. In the structure illustrated in FIG. 16, the light-source substrate 15 on which the light source 12 is mounted can be easily removed from the prism 14 by removing the screws 803C and 803D.

As described above, in the case where the removably attaching mechanisms illustrated in FIGS. 13 to 16 are provided, the light source 12 and the light-source substrate 15 can be easily removed for maintenance or replaced.

[Modifications]

In the first embodiment, as illustrated in FIG. 3, the light emitted from the light source 12 is incident on the light guide plate 11 at an incident angle of 50°. However, the incident angle may be changed as appropriate. This will now be described.

Figure 17:
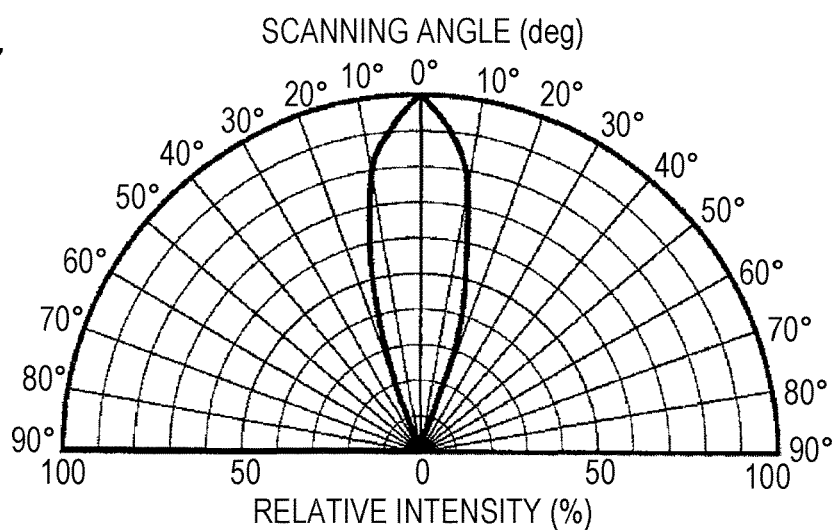
FIG. 17 illustrates the directivity at which the half-value angle is ±15°.
Figure 18:
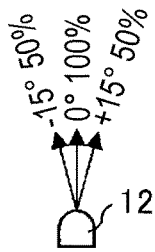
FIG. 18 illustrates an LED having the directivity at which the half-value angle is ±15°.

As illustrated in FIGS. 17 and 18, in the case where the half-value angle of the light source 12 (radiation angle of light having a relative intensity of 50% or more) is ±15°, the incident angle is optimally set to 57.15° to efficiently deliver the light in the range of the half-value angle to the light guide plate 11. However, to set the incident angle to 57.15°, the size of the prism 14 needs to be increased, and the material cost increases accordingly. Therefore, in the first embodiment, the incident angle is set to 50° to reduce the size of the prism 14.

Although the incident angle is set to 50° in consideration of the size of the prism 14 in the first embodiment, the incident angle is preferably in the range of 50° to 57.15° to make the light in the range of the half-value angle to be incident as efficiently as possible. The incident angle may be any angle that is greater than the critical angle. Therefore, when the light guide plate 11 is made of an acrylic resin (refractive index 1.49) and the half-value angle of the light source 12 is ±15°, the incident angle may be any value that is greater than 42.15° and smaller than or equal to 57.15°.

Figure 19:
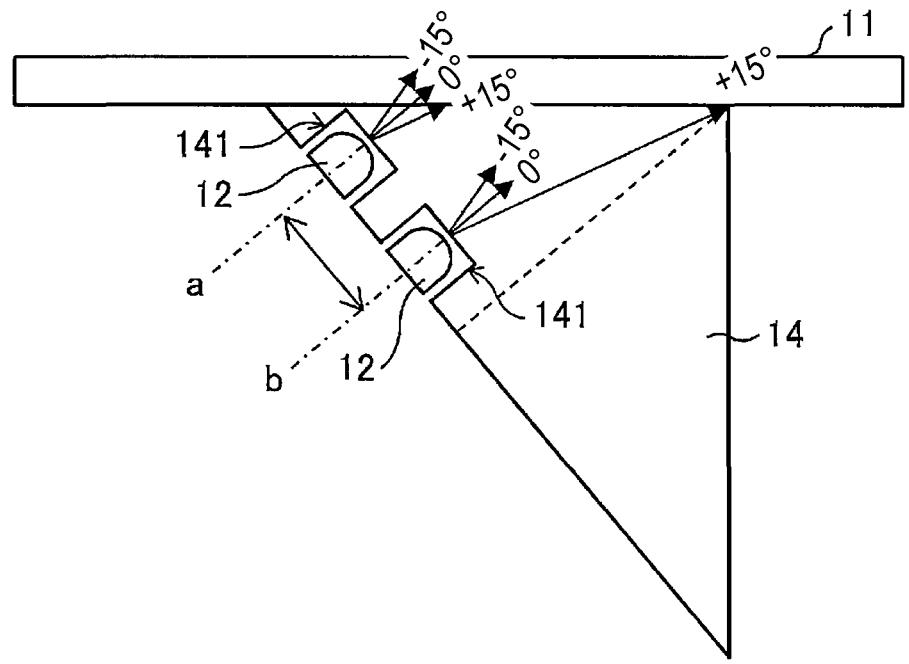
FIG. 19 illustrates an optimum light-source arrangement range.

In the region in which the light source 12 can be installed (physically installable area), the region in which the light source 12 is to be installed to enable the light from the light source 12 in the range of the half-value angle to reach the light guide plate 11 while minimizing the reflection in the prism 14 is the region between a and b in FIG. 19. Therefore, the light source 12 is preferably disposed in the region between a and b in FIG. 19. In such a case, the light from the light source 12 can be efficiently delivered to the light guide plate 11.

Figure 20:
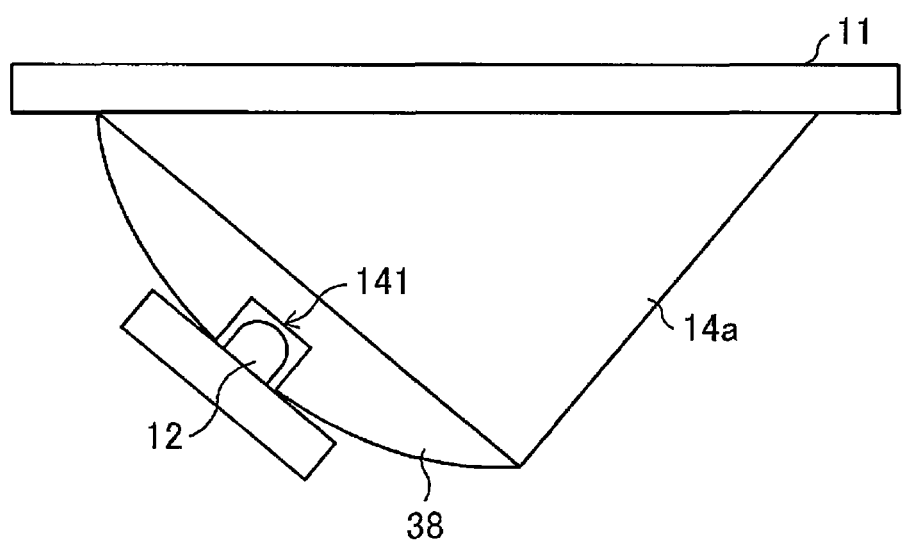
FIG. 20 illustrates a modification of the prism.

Although the prism 14 has the shape of a triangular prism in the first embodiment, the shape of the prism 14 is not limited to the shape a triangular prism, and may instead be, for example, the shape of any type of polygonal prism, cylindrical, semicylindrical, or the shape of a halved barrel. The prism may be in any shape as long as it is a well-known prism. As illustrated in FIG. 20, a member obtained by joining a prism 14a to a cylindrical lens 38 may be used. The cylindrical lens 38 and the prism 14a may be joined together by using an adhesive or a solvent. Alternatively, the cylindrical lens 38 and the prism 14a may be formed integrally with each other.

Figure 21:
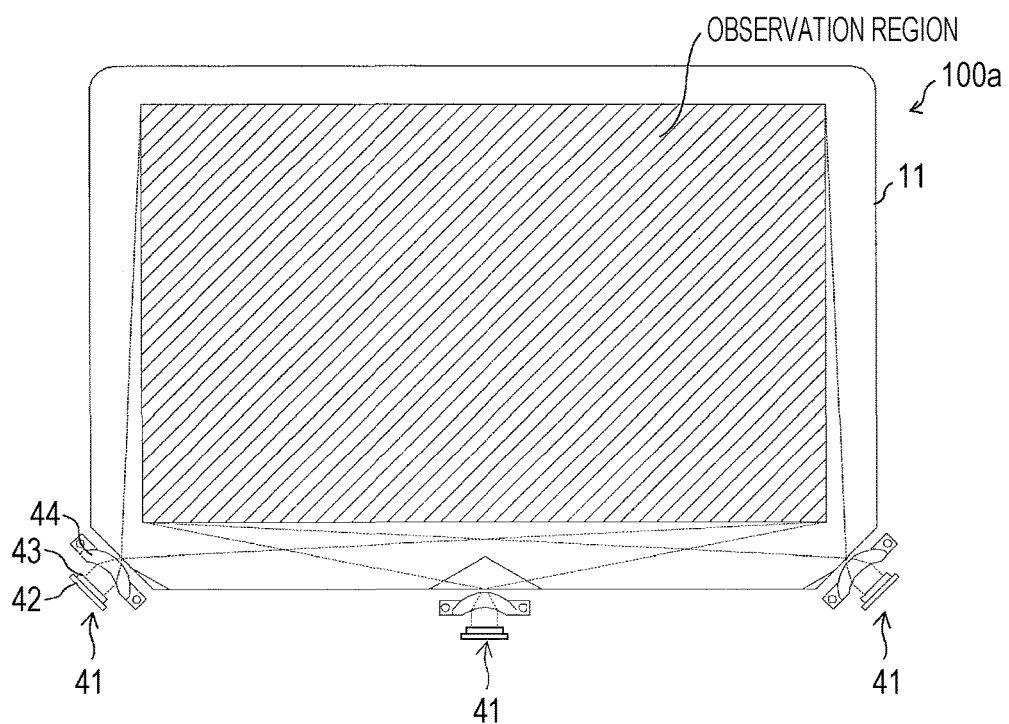
FIG. 21 illustrates a modification of light receiving units attached to the touch panel.

A light receiving unit including a line sensor may be used in place of each light receiving unit 13 illustrated in FIG. 7. FIG. 21 illustrates a touch panel according to a modification. The touch panel 100a illustrated in FIG. 21 includes light receiving units 41 in place of the light receiving units 13. Each light receiving unit 41 includes a substrate 42, a detection device (line sensor) 43, and a lens 44, and faces a side end surface of the light guide plate 11.

SUMMARY

According to a first aspect of the present invention, a position input device 10 included in a touch panel 100 that detects a contact position of a contact operation includes a light source 12; a light guide plate 11; a prism 14 including a side surface 14a (joining portion) that is joined to the light guide plate 11 and a groove 141 including a wall surface (incident potion) on which light from the light source 12 is incident, the prism 14 causing the light incident on the wall surface of the groove 141 to be incident on the light guide plate 11 through the side surface 14a; a light receiving unit 13 that receives scattered light of the light incident on the light guide plate 11, the scattered light being generated in response to the contact operation, and outputs light reception data, which is information representing a result of reception of the scattered light and used to detect the contact position; and plating 200 (non-transmissive portion) that covers a surface of the prism 14 over a region excluding at least the side surface 14a and the wall surface of the groove 141, the plating 200 blocking transmission of the light.

According to the first aspect of the present invention, the surface of the prism 14 is covered with the plating 200 over the region excluding at least the side surface 14a and the wall surface of the groove 141. Therefore, the risk that light other than the scattered light will leak from the surface of the prism 14 and reach the light receiving unit 13 can be reduced. Accordingly, a reduction in the contact-position detection accuracy can be reduced.

According to a second aspect of the present invention, in the structure of the first aspect, the non-transmissive portion is the plating 200 (first reflecting portion) that reflects light from the prism toward the prism.

According to the second aspect of the present invention, the light from the prism 14 that has reached the plating 200 is reflected toward the prism 14. Therefore, a reduction in the amount of light that travels from the prism 14 to the light guide plate 11 can be suppressed, and loss in the amount of light can be reduced.

According to a third aspect of the present invention, in the structure according to the first or second aspect, the prism 14 includes the groove (recess) 141 in which the light source 12 is inserted, and the wall surface of the groove 141 serves as the incident potion.

According to the third aspect of the present invention, since the light source 12 is surrounded by the wall surface of the groove 141 in the prism 14, the light emitted from the light source 12 can be efficiently delivered to the prism 14.

According to a fourth aspect of the present invention, in the structure according to the third aspect, the prism 14 has the shape of a polygonal prism, the groove 141 is formed in a side surface 14c of the prism 14, and a light-source substrate 15 on which the light source 12 is disposed is provided. The light-source substrate 15 is made of a light-blocking material and covers the groove 141 in such a manner that the light source 12 is inserted in the groove 141.

According to the fourth aspect of the present invention, since the groove 141 is covered by the light-blocking material, leakage of light from the groove 141 can be suppressed.

According to a fifth aspect of the present invention, in the structure according to the fourth aspect, the groove 141 is formed so as to extend from one bottom surface (first bottom surface) 14d to the other bottom surface (second bottom surface) 14e of the prism 14. A cover (first cover member) 300a, which covers a portion of the groove 141 formed in the bottom surface 14d, is attached to the bottom surface 14d, and a cover (second cover member) 300b, which covers a portion of the groove 141 formed in the bottom surface 14e, is attached to the bottom surface 14e.

According to the fifth aspect of the present invention, even when the groove 141 is formed so as to extend from one bottom surface 14d to the other bottom surface 14e of the prism 14, since the cover member 300a, which covers the portion of the groove 141 formed in the bottom surface 14d, is attached to the bottom surface 14d and the cover member 300b, which covers a portion of the groove 141 formed in the bottom surface 14e, is attached to the bottom surface 14e, leakage of light from the groove 141 can be suppressed.

In the fourth or fifth aspect of the present invention, in the case where the light-source substrate 15 that blocks light is in close contact with the side surface 14c of the prism 14, leakage of light from a portion of the side surface 14c of the prism 14 that is in close contact with the light-source substrate 15 is suppressed even when the plating 200 is not provided. Therefore, according to a sixth aspect of the present invention, in the structure according to the fourth or fifth aspect, the light-source substrate 15 is in close contact with the side surface 14c so as to cover the groove 141, and the plating 200 covers the surface of the prism 14 over a region excluding the side surface 14a, the wall surface of the groove 141, and the portion of the side surface 14c that is in close contact with the light-source substrate 15.

According to a seventh aspect of the present invention, in the structure of any one of the third to sixth aspects, a space between the wall surface of the groove 141 and the light source 12 is filled with a transparent resin 160.

According to the seventh aspect of the present invention, even when the wall surface of the groove 141 is not polished, the occurrence of scattering of light on the wall surface of the groove 141 can be reduced. Accordingly, a reduction in the amount of light incident on the prism 14 can be suppressed. The manufacturing process for the structure of the fourth aspect of the present invention is simpler than that for the structure in which the wall surface of the groove 141 is polished.

According to an eighth aspect of the present invention, in the structure according to any one of the third to sixth aspects, a removably attaching mechanism 800 to 803 for removably attaching the light-source substrate 15 to the prism 14 is provided.

According to the eighth aspect of the present invention, the light source 12 and the light-source substrate 15 can be easily removed for maintenance or replaced.

According to a ninth aspect of the present invention, in the structure according to any one of the first to eighth aspects, the prism 14 is joined to a surface (back surface) of the light guide plate 11 that is opposite to a surface on which the contact operation is performed (surface with which the detection target X comes into contact).

The structure according to the ninth aspect of the present invention is advantageous over the structure in which the prism 14 is joined to a side surface of the light guide plate 11 in that, for example, the size and cost of the device can be reduced.

According to a tenth aspect of the present invention, in the structure according to any one of the first to ninth aspects, a reflecting portion (second reflecting portion) 280 is provided on an end portion of the light guide plate 11, the reflecting portion 280 reflecting light toward the inside of the light guide plate 11.

According to the tenth aspect of the present invention, since leakage of light from the light guide plate 11 can be suppressed, a reduction in the contact-position detection accuracy and loss in the amount of light can be suppressed.

According to an eleventh aspect of the present invention, in the structure according to any one of the first to tenth aspects, at least one of a corner or a ridge of the prism 14 is chamfered.

According to the eleventh aspect of the present invention, even when an operator touches the prism 14 during the manufacture or maintenance of the position input device 10, the risk of injury and damage to the prism during assembly can be reduced because at least one of a corner or a ridge of the prism 14 is chamfered.

According to a twelfth aspect of the present invention, a touch panel 100 includes a display device 30; the position input device 10 according to any one of the first to eleventh aspects, the position input device 10 facing a display screen of the display device 30; and a position detection unit 22 that detects the contact position of the detection target based on the light reception data output by the light receiving unit 13.

The present invention is not limited to the above-described embodiments, and various modifications are possible within the scope of the claims. Embodiments obtained by combining technical means modified as appropriate within the scope of the claims are also included in the technical scope of the present invention.

INDUSTRIAL APPLICABILITY

The present invention may be applied to FTIR-type touch panels.

REFERENCE SIGNS LIST 10 position input device
11 light guide plate
12 light source
13 light receiving unit
14 prism
14a side surface (joining portion)
14b side surface
14c side surface
14d bottom surface (first bottom surface)
14e bottom surface (second bottom surface)
15 light-source substrate
22 contact position determination unit (position detection unit)
30 display device
100 touch panel
141 groove (recess)
141a bottom portion (incident potion, wall surface)
141b side portion (incident potion, wall surface)
160 transparent resin
200 plating (non-transmissive portion, first reflecting portion)
280 reflecting portion (second reflecting portion)
300a cover (first cover member)
300b cover (second cover member)
800 to 803 removably attaching mechanism
X detection target (contact body)

The invention claimed is:

1. A position input device included in a touch panel that detects a contact position of a contact operation, the position input device comprising:
 a light source;
 a light guide plate;
 a prism including a joining portion that is joined to the light guide plate, a recess in which the light source is inserted, and an incident portion on which light from the light source is incident, the prism causing the light incident on the incident portion to be incident on the light guide plate through the joining portion, wherein a wall surface of the recess serves as the incident portion;
 a light receiving unit that receives scattered light of the light incident on the light guide plate, the scattered light being generated in response to the contact operation, and outputs light reception data, which is information representing a result of reception of the scattered light and used to detect the contact position; and
 a non-transmissive portion that covers a surface of the prism over a region excluding at least the joining portion and the incident portion, the non-transmissive portion blocking transmission of the light.

2. The position input device according to claim 1, wherein the non-transmissive portion is a first reflecting portion that reflects light from the prism toward the prism.

3. The position input device according to claim 1, wherein the prism has a shape of a polygonal prism,
 wherein the recess is formed in a side surface of the prism,
 wherein the position input device further comprises a light-source substrate on which the light source is disposed, and
 wherein the light-source substrate is made of a light-blocking material and covers the recess in such a manner that the light source is inserted in the recess.

4. The position input device according to claim 3, wherein the recess is formed so as to extend from a first bottom surface to a second bottom surface of the prism, and
 wherein a first cover member, which covers a portion of the recess formed in the first bottom surface, is attached to the first bottom surface, and a second cover member, which covers a portion of the recess formed in the second bottom surface, is attached to the second bottom surface.

5. The position input device according to claim 3, wherein the light-source substrate is in close contact with the side surface so as to cover the recess, and
 wherein the non-transmissive portion covers the surface of the prism over a region excluding the joining portion, the incident portion, and a portion of the side surface that is in close contact with the light-source substrate.

6. The position input device according to claim 3, further comprising a removably attaching mechanism for removably attaching the light-source substrate to the prism.

7. The position input device according to claim 1, wherein a space between the wall surface of the recess and the light source is filled with a transparent resin.

8. The position input device according to claim 1, wherein the prism is joined to a surface of the light guide plate that is opposite to a surface on which the contact operation is performed.

9. The position input device according to claim 1, wherein a second reflecting portion is provided on an end portion of the light guide plate, the second reflecting portion reflecting light toward an inside of the light guide plate.

10. The position input device according to claim 1, wherein at least one of a corner or a ridge of the prism is chamfered.

11. A touch panel comprising:
 a display device;
 the position input device according to claim 1, the position input device facing a display screen of the display device; and a position detection unit that detects the contact position of the contact operation based on the light reception data output by the light receiving unit.

* * * * *